US008690055B2

(12) United States Patent
Anderson et al.

(10) Patent No.: US 8,690,055 B2
(45) Date of Patent: Apr. 8, 2014

(54) ELECTRONIC CARD

(75) Inventors: Roy L. Anderson, Glendale, CA (US); Jacob Y Wong, Goleta, CA (US); Larry Routhenstein, Orlando, CA (US)

(73) Assignee: PrivaSys, Inc., Tiburon, CA (US)

( * ) Notice: Subject to any disclaimer, the term of this patent is extended or adjusted under 35 U.S.C. 154(b) by 0 days.

(21) Appl. No.: 13/438,710

(22) Filed: Apr. 3, 2012

(65) Prior Publication Data

US 2012/0205443 A1    Aug. 16, 2012

Related U.S. Application Data

(63) Continuation of application No. 10/968,399, filed on Oct. 18, 2004, now Pat. No. 8,191,772, and a continuation of application No. 10/968,401, filed on Oct. 18, 2004, which is a continuation of application No. 09/960,714, filed on Sep. 21, 2001, now Pat. No. 6,805,288, said application No. 10/968,399 is a continuation of application No. 09/960,714, filed on Sep. 21, 2001, now Pat. No. 6,805,288, which is a continuation-in-part of application No. 09/667,081, filed on Sep. 21, 2000, now abandoned, and a continuation-in-part of application No. 09/667,089, filed on Sep. 21, 2000, now abandoned, which is a continuation-in-part of application No. 09/659,434, filed on Sep. 8, 2000, now abandoned, which is a continuation-in-part of application No. 09/640,044, filed on Aug. 15, 2000, now abandoned, which is a continuation-in-part of application No. 09/619,859, filed on Jul. 20, 2000, now abandoned, which is a continuation-in-part of application No. 09/571,707, filed on May 15, 2000, now Pat. No. 6,592,044.

(51) Int. Cl.
*G07F 19/00* (2006.01)
*G06K 5/00* (2006.01)

(52) U.S. Cl.
USPC .......................................... 235/380; 235/379

(58) Field of Classification Search
USPC ........................ 235/375, 379–382.5, 487, 492
See application file for complete search history.

(56) References Cited

U.S. PATENT DOCUMENTS 3,665,161 A    5/1972    Oberhart
3,845,277 A    10/1974   Voss et al.
(Continued)

FOREIGN PATENT DOCUMENTS

AU    732877    12/1998
EP    1 017 030    7/2000
(Continued)

OTHER PUBLICATIONS

Hogan et al. U.S. Appl. No. 60/280,776 entitled "Improved System and Method for Secure Payment Application (SPA) and Universal Cardholder Authentication" filed Apr. 2, 2001.

(Continued)

*Primary Examiner* — Thien M Le
*Assistant Examiner* — April Taylor
(74) *Attorney, Agent, or Firm* — Roy L. Anderson; Wagner, Anderson & Bright, P.C.

(57) ABSTRACT

An electronic card has a power source, a user selection mechanism operable to allow a user to select a customization variable for a single transaction, a processor for generating a transaction specific data packet that includes a card number and a customized number and an electronic communication device operable to cause the data packet to be read by a read head of a magnetic strip reader. The electronic communication device is operable to dynamically convey the transaction specific data packet to a read head of a magnetic card reader so that the transaction specific data packet is read by the read head. The transaction specific data packet is dynamically generated for use by the card for the single transaction of the card and the customized number is determined based upon the customization variable selected by the user selection mechanism.

20 Claims, 10 Drawing Sheets

(56) References Cited

U.S. PATENT DOCUMENTS

| | | |
|---|---|---|
| 4,016,405 A | 4/1977 | McCune et al. |
| 4,102,493 A | 7/1978 | Moreno |
| 4,214,230 A | 7/1980 | Fak et al. |
| 4,234,932 A | 11/1980 | Gorgens |
| 4,253,017 A | 2/1981 | Whitehead |
| 4,314,352 A | 2/1982 | Fought |
| 4,390,968 A | 6/1983 | Hennessy et al. |
| 4,437,130 A | 3/1984 | Hennessy et al. |
| 4,438,326 A | 3/1984 | Uchida |
| 4,443,027 A | 4/1984 | McNeely |
| 4,458,142 A | 7/1984 | Bernstein |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,689,478 A | 8/1987 | Hale et al. |
| 4,701,601 A | 10/1987 | Francini et al. |
| 4,707,594 A | 11/1987 | Roth |
| 4,742,351 A | 5/1988 | Suzuki |
| 4,755,940 A | 7/1988 | Brachtl et al. |
| 4,772,782 A | 9/1988 | Nonat |
| D298,317 S * | 11/1988 | Watanabe ............... D14/138 R |
| 4,791,283 A | 12/1988 | Burkhardt |
| 4,837,822 A | 6/1989 | Crosley et al. |
| 4,849,613 A | 7/1989 | Eisele |
| 4,868,376 A | 9/1989 | Lessin et al. |
| 4,893,001 A * | 1/1990 | Ohkubo et al. ............... 235/490 |
| 4,918,631 A | 4/1990 | Hara et al. |
| 4,926,480 A | 5/1990 | Chaum |
| 4,928,001 A | 5/1990 | Masada |
| 4,959,788 A | 9/1990 | Nagata et al. |
| 4,960,982 A | 10/1990 | Takahira |
| 4,990,759 A | 2/1991 | Gloton et al. |
| 5,130,519 A | 7/1992 | Bush et al. |
| 5,168,520 A | 12/1992 | Weiss |
| 5,192,947 A | 3/1993 | Neustein |
| 5,220,501 A | 6/1993 | Lawlor et al. |
| 5,317,636 A | 5/1994 | Vizcaino |
| 5,365,221 A * | 11/1994 | Fennell et al. ........... 340/636.15 |
| 5,371,797 A | 12/1994 | Bocinsky, Jr. |
| 5,373,558 A | 12/1994 | Chaum |
| 5,375,037 A | 12/1994 | Le Roux |
| 5,412,192 A | 5/1995 | Hoss |
| 5,426,283 A | 6/1995 | Berthozat et al. |
| 5,434,398 A | 7/1995 | Goldberg |
| 5,434,919 A | 7/1995 | Chaum |
| 5,438,186 A | 8/1995 | Nair et al. |
| 5,440,108 A | 8/1995 | Tran et al. |
| 5,444,616 A | 8/1995 | Nair et al. |
| 5,448,047 A | 9/1995 | Nair et al. |
| 5,455,407 A | 10/1995 | Rosen |
| 5,471,045 A | 11/1995 | Geronimi |
| 5,473,690 A | 12/1995 | Grimonprez |
| 5,497,411 A | 3/1996 | Pellerin |
| 5,538,442 A | 7/1996 | Okada |
| 5,557,518 A | 9/1996 | Rosen |
| 5,568,121 A | 10/1996 | Lamensdorf |
| 5,578,808 A | 11/1996 | Taylor |
| 5,585,787 A | 12/1996 | Wallerstein |
| 5,590,038 A | 12/1996 | Pitroda |
| 5,590,197 A | 12/1996 | Chen et al. |
| 5,623,552 A | 4/1997 | Lane |
| 5,627,355 A | 5/1997 | Rahman et al. |
| 5,655,008 A | 8/1997 | Futch et al. |
| 5,671,280 A | 9/1997 | Rosen |
| 5,689,247 A | 11/1997 | Welner |
| 5,745,555 A | 4/1998 | Mark |
| 5,754,652 A | 5/1998 | Wilfong |
| 5,754,653 A | 5/1998 | Canfield |
| 5,754,656 A | 5/1998 | Nishioka et al. |
| 5,761,309 A | 6/1998 | Ohashi et al. |
| 5,790,677 A | 8/1998 | Fox et al. |
| 5,825,871 A | 10/1998 | Mark |
| 5,831,862 A | 11/1998 | Hetrick et al. |
| 5,834,747 A | 11/1998 | Cooper |
| 5,834,756 A | 11/1998 | Gutman et al. |
| 5,844,497 A | 12/1998 | Gray |
| 5,850,442 A | 12/1998 | Muftic |
| 5,883,810 A | 3/1999 | Franklin et al. |
| 5,884,271 A | 3/1999 | Pitroda |
| 5,905,246 A | 5/1999 | Fajkowski |
| 5,913,203 A | 6/1999 | Wong et al. |
| 5,915,226 A | 6/1999 | Martineau |
| 5,917,168 A | 6/1999 | Nakamura et al. |
| 5,936,226 A | 8/1999 | Aucsmith |
| 5,936,541 A | 8/1999 | Stambler |
| 5,937,394 A | 8/1999 | Wong et al. |
| 5,940,511 A | 8/1999 | Wilfong |
| 5,953,710 A | 9/1999 | Fleming |
| 5,955,961 A | 9/1999 | Wallerstein |
| 5,956,699 A | 9/1999 | Wong et al. |
| 5,991,412 A | 11/1999 | Wissenburgh et al. |
| 6,000,832 A | 12/1999 | Franklin et al. |
| 6,003,763 A | 12/1999 | Gallagher et al. |
| 6,012,634 A | 1/2000 | Brogan et al. |
| 6,012,636 A | 1/2000 | Smith |
| 6,018,717 A | 1/2000 | Lee et al. |
| 6,024,288 A | 2/2000 | Gottlich et al. |
| 6,029,150 A | 2/2000 | Kravitz |
| 6,029,890 A | 2/2000 | Austin |
| 6,032,134 A | 2/2000 | Weissman |
| 6,038,492 A | 3/2000 | Nichols et al. |
| 6,047,268 A | 4/2000 | Bartoli et al. |
| 6,050,493 A | 4/2000 | Fertig |
| 6,068,184 A | 5/2000 | Barnett |
| 6,068,192 A | 5/2000 | McCabe |
| 6,072,870 A | 6/2000 | Nguyen et al. |
| 6,075,861 A | 6/2000 | Miller, II |
| 6,078,888 A | 6/2000 | Johnson, Jr. |
| 6,078,902 A | 6/2000 | Schenkler |
| 6,089,451 A | 7/2000 | Krause |
| 6,098,053 A | 8/2000 | Slater |
| 6,101,477 A | 8/2000 | Hohle et al. |
| 6,111,953 A | 8/2000 | Walker et al. |
| 6,122,625 A | 9/2000 | Rosen |
| 6,132,799 A | 10/2000 | Corniglion et al. |
| 6,163,771 A | 12/2000 | Walker et al. |
| D436,620 S | 1/2001 | Webb et al. |
| 6,188,309 B1 | 2/2001 | Levine |
| 6,205,436 B1 | 3/2001 | Rosen |
| 6,206,293 B1 | 3/2001 | Gutman et al. |
| RE37,122 E | 4/2001 | Levine et al. |
| 6,213,403 B1 | 4/2001 | Bates, III |
| 6,215,665 B1 | 4/2001 | Martin |
| 6,227,447 B1 | 5/2001 | Campisano |
| 6,230,977 B1 | 5/2001 | Johnson |
| 6,257,486 B1 | 7/2001 | Teicher et al. |
| 6,315,195 B1 * | 11/2001 | Ramachandran ............ 235/380 |
| 6,327,578 B1 | 12/2001 | Linehan |
| 6,332,134 B1 | 12/2001 | Foster |
| 6,339,766 B1 | 1/2002 | Gephart |
| 6,343,284 B1 | 1/2002 | Ishikawa et al. |
| 6,394,343 B1 | 5/2002 | Berg et al. |
| 6,425,523 B1 | 7/2002 | Shem-Ur et al. |
| 6,518,927 B2 | 2/2003 | Schremmer et al. |
| 6,574,730 B1 | 6/2003 | Bissell et al. |
| 6,607,127 B2 | 8/2003 | Wong |
| 6,636,833 B1 | 10/2003 | Flitcroft et al. |
| 6,805,288 B2 | 10/2004 | Routhenstein et al. |
| 6,834,270 B1 | 12/2004 | Pagani et al. |
| 6,915,279 B2 | 7/2005 | Hogan et al. |
| 6,925,439 B1 * | 8/2005 | Pitroda .......................... 705/1.1 |
| 6,990,470 B2 | 1/2006 | Hogan et al. |
| 7,058,611 B2 | 6/2006 | Kranzley et al. |
| 8,315,948 B2 * | 11/2012 | Walker et al. ................... 705/50 |
| 2001/0034720 A1 | 10/2001 | Armes |
| 2001/0047335 A1 | 11/2001 | Arndt et al. |

(56) References Cited

U.S. PATENT DOCUMENTS

| | | |
|---|---|---|
| 2002/0035548 A1 | 3/2002 | Hogan et al. |
| 2002/0083010 A1 | 6/2002 | Kim |
| 2002/0120584 A1 | 8/2002 | Hogan et al. |
| 2003/0120615 A1 | 6/2003 | Kuo |

FOREIGN PATENT DOCUMENTS

| | | |
|---|---|---|
| EP | 1 028 401 | 8/2000 |
| JP | 402148374 A | 6/1980 |
| JP | 355143679 A | 10/1980 |
| JP | 405040864 A | 2/1993 |
| WO | WO 92/16913 | 10/1992 |
| WO | WO 99/05633 | 2/1999 |
| WO | WO 99/38129 | 7/1999 |
| WO | WO 99/49424 | 9/1999 |
| WO | WO 99/57675 | 11/1999 |
| WO | WO 00/25262 | 5/2000 |
| WO | WO 00/30048 | 5/2000 |
| WO | WO 00/33497 | 6/2000 |
| WO | WO 00/49586 | 8/2000 |
| WO | WO 00/52900 | 9/2000 |
| WO | WO 00/54208 | 9/2000 |
| WO | WO 01/46902 A1 | 6/2001 |
| WO | WO 01/50429 A1 | 7/2001 |
| WO | WO 01/54082 A1 | 7/2001 |
| WO | WO 01/69556 | 9/2001 |
| WO | WO 01/71675 | 9/2001 |
| WO | WO 01/78024 | 10/2001 |

OTHER PUBLICATIONS

Hogan et al. U.S. Appl. No. 60/255,168 entitled "Method and System for Conducting Secure Electronic Commerce Transactions" filed Aug. 14, 2000.

Hogan et al. U.S. Appl. No. 60/226,227 entitled "Method and System for Conducting Secure MasterCard Payments Over a Computer Network" filed Aug. 18, 2000.

Hogan et al. U.S. Appl. No. 60/213,063 entitled "An Improved Method and system for Conducting Secure Payments Over a Computer Network" filed Jun. 21, 2000.

Hogan et al. U.S. Appl. No. 09/809,367 entitled Method and System for Secure Payments Over a Computer Network filed Mar. 15, 2001.

Hogan et al. U.S. Appl. No. 60/195,963 entitled "Method and System for Conducting Secure Payments Over a Computer Network" filed Apr. 11, 2000.

Hogan et al. U.S. Appl. No. 60/274,785 entitled System and Method for Secure Payment Application (SPA) and Universal Cardholder Authentication filed Mar. 9, 2001.

Hogan et al. U.S. Appl. No. 60/295,630 entitled Method and Process for a Secure Payment Application Using a Universal Cardholder Authentication filed Jun. 4, 2001.

Hogan et al. U.S. Appl. No. 60/307,575 entitled "Method and System for Conducting Transaction Over a Communication Network Using a Secure Payment Application" filed Jul. 24, 2001.

Hogan et al. U.S. Appl. No. entitled Method and System for Conducting Secure Electronic Commerce Tansactions filed Jun. 22, 2000.

Hogan, U.S. Appl. No. 09/833,049.

EMV '96 Integrated Circuit Card Application Specification for Payment Systems, Version 3.1.1 (May 31, 1998(.

ISO/IEC JTC 1/SC 27 Information Technology—Security Techniques (May 10, 1999).

* cited by examiner

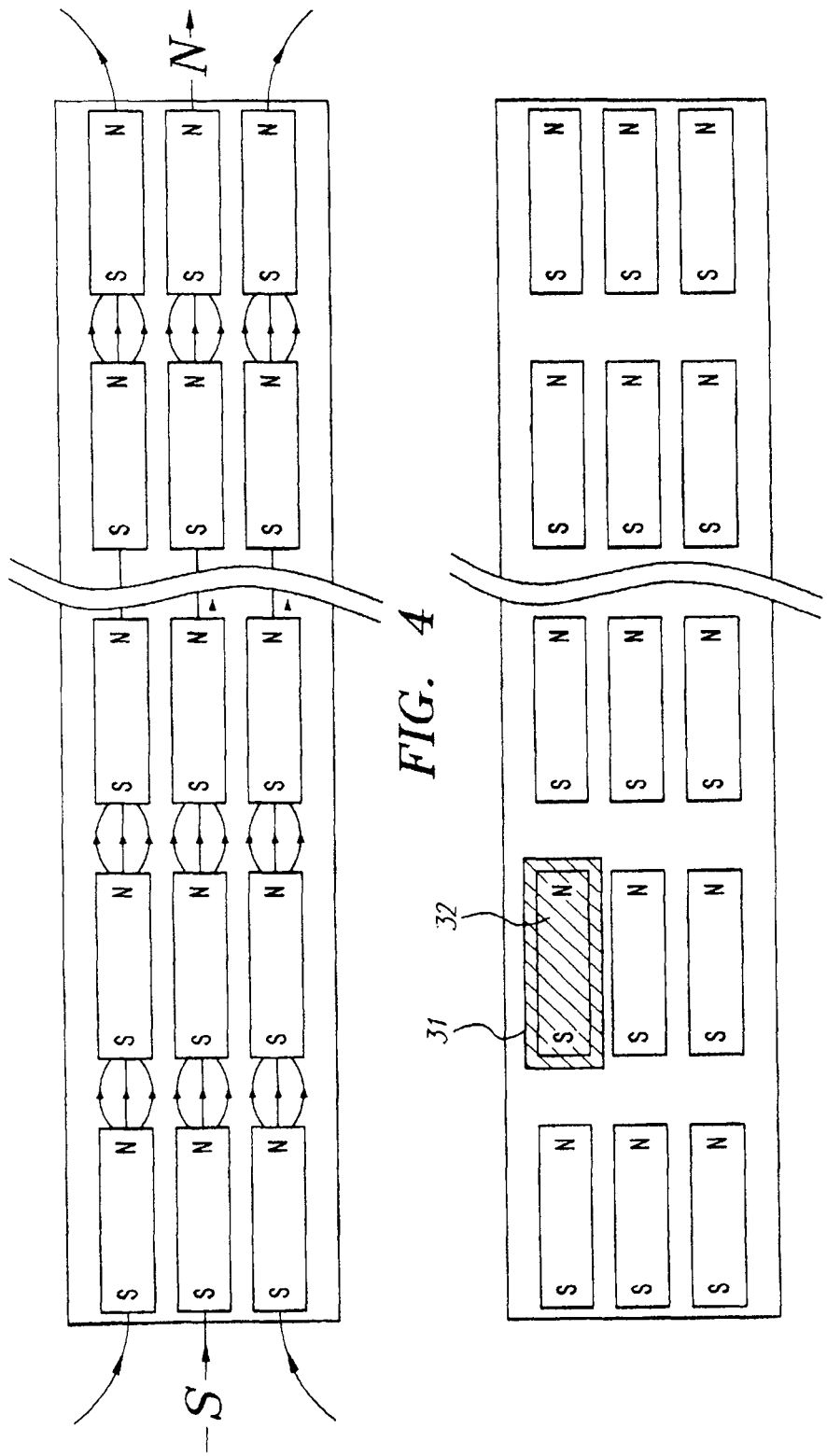

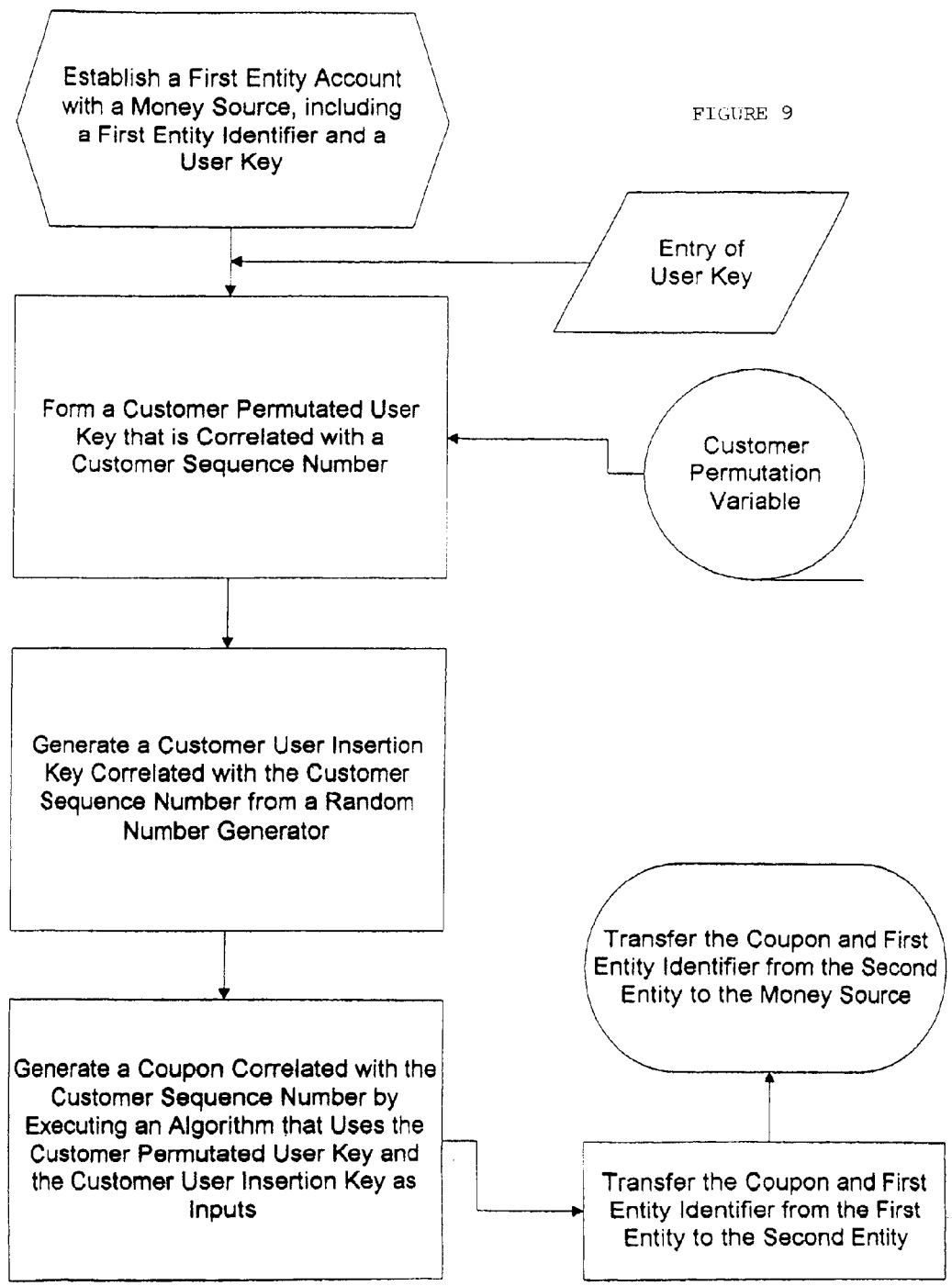

ELECTRONIC CARD

CROSS REFERENCE TO RELATED APPLICATIONS

The present application is a continuation application of U.S. patent application Ser. Nos. 10/968,399 and 10/968,401, both of which were filed Oct. 18, 2004, both of which were continuation applications of U.S. patent application Ser. No. 09/960,714, filed Sep. 21, 2001, which was a continuation-in-part application of U.S. application Ser. Nos. 09/667,081 and 09/667,089, filed Sep. 21, 2000, which are continuation-in-part applications of U.S. Ser. No. 09/659,434, filed Sep. 8, 2000, which is a continuation-in-part of U.S. Ser. No. 09/640,044, filed Aug. 15, 2000, which is a continuation-in-part of U.S. Ser. No. 09/619,859, filed Jul. 20, 2000, which is a continuation-in-part of U.S. Pat. No. 6,592,044, all of which disclosures are specifically incorporated herein by reference. The present application is also related to U.S. patent application Ser. Nos. 09/667,835, 09/667,089, and 09/667,082, all of which were filed on Sep. 21, 2000, and all of which are specifically incorporated herein by reference.

FIELD OF THE INVENTION

The present invention is in the field of cards readable by a magnetic stripe reader.

BACKGROUND OF THE INVENTION

Three forms of money in widespread use today throughout the world are cash, checks and payment cards (debit or credit). Each has distinct advantages, and distinct disadvantages. Cash is readily accepted, easy to use and anonymous, but it does not earn interest, it can be lost or stolen, and it is not always readily accessible. Checks are not always accepted, but they offer many advantages, since they do not have to be written until the time of payment. However, they must be physically presented and they are not anonymous. Payment cards are readily, but not always, accepted, and they offer many advantages over checks. If the card is a credit card, payment can be deferred, but the transaction is not anonymous. If the card is a debit card, payment has usually been made prior to its use, but it is anonymous. Accordingly, it is apparent that different types of money have different advantages to different persons in different situations. This may be one reason why all these forms of money are still in widespread use, and are even used by the same persons at different times.

As society and international commerce have become more dependent upon electronic transactions, money has also become more electronic. Many attempts have been made to come up with suitable forms of electronic money that mimic the physical world, or even create new forms of electronic money. However, despite the enormous need for such money, and efforts by some of the best minds and most successful companies in the world, electronic money has suffered many setbacks and been far slower to materialize than many had hoped or predicted. The reasons are many and varied, but some of the obvious reasons are security, ease of use/operation, and unwillingness of the public and/or commerce to make radical changes or embrace new technology and/or procedures. As a result, many efforts, including several potentially promising efforts, have met with failure.

Even though new forms of electronic money have been slow to develop or gain widespread acceptance, electronic payments have still moved forward. Many banks now offer some form of electronic checking. And payment cards have been used for electronic transactions in e-commerce and m-commerce (mobile commerce). Still, there is widespread concern about the safety of such transactions, and recent news stories have uncovered widespread fraudulent activity associated with use of traditional credit card numbers in e-commerce over the Internet. In addition, there is growing concern about consumer privacy, or lack thereof, due to widespread electronic profiling of consumers who make electronic payments.

Although the media has been quick to cover fraud associated with use of credit cards over the Internet, it is often overlooked, at least by the public and the media (but not the credit card companies), that the majority of fraudulent activity concerning credit cards is not associated with e-commerce activity. Most fraud occurs in the "brick and mortar" world, and the numbers are daunting. Despite many attempts to combat unauthorized or fraudulent use of credit cards, it is estimated that credit card fraud now exceeds hundreds of millions, if not several billion, dollars per year. And this does not even count the cost of inconvenience to consumers, merchants and credit card issuer/providers, or the emotional distress caused to victims of such fraud, or the cost to society in terms of law enforcement and preventative activities.

Accordingly, there is a very real, long-felt need to reduce the amount of fraudulent activity that is associated with credit cards, and this need has only grown more acute as consumers and commerce search for better ways to purchase and sell goods and services via e-commerce and m-commerce. However, any solution needs to be something that is acceptable to the public at large. It should be easy to use. It should not be complicated or expensive to implement. Preferably, it should fit within the existing infrastructure, and not be something that requires a great deal of educational effort, or a radical change in behavior or habits of consumers. In other words, it should be user friendly, readily understandable and something that does not require a completely new infrastructure, which is a reason suggested by some as to why smart cards have not been widely accepted in the United States.

In addition, it is highly desirable that any solution to such problems be capable of widespread use, in many different platforms, for many different applications.

In U.S. Pat. No. 5,956,699 issued in September of 1999, Wong and Anderson were the first to introduce the methodology of a system for secure and anonymous credit card transactions on the Internet. This patent introduced a system which used an algorithm to use one's own selected Personal Identification Number or PIN as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity, and thus privacy, in credit card purchases on the Internet.

Since the issuance of U.S. Pat. No. 5,956,699, Wong and Anderson have also invented an anonymous electronic card for generating personal Coupons useful in commercial and security transactions, as well as various methods related to earlier work.

SUMMARY OF THE INVENTION

The present invention is generally directed to an electronic card having a power source contained within the card, a user selection mechanism operable to allow a user to select a customization variable for a single transaction of the card, a processor for generating a transaction specific data packet that includes a card number and a customized number and an electronic communication device operable to cause the data packet to be read by a read head of a magnetic strip reader. The electronic communication device is operable to dynamically convey the transaction specific data packet to a read head of a magnetic card reader so that the transaction specific data packet is read by the read head. The transaction specific data packet is dynamically generated for use by the card for the single transaction of the card and the customized number is determined based upon the customization variable selected by the user selection mechanism.

The transaction specific data packet can include a piece of data that is generated by a cryptographic algorithm in response to an input from the user selection mechanism. The card number and a cryptographic key can be stored in the card and accessible by the processor. The transaction specific data packet can include a block of data formed by using a Triple Data Encryption Standard algorithm to encrypt a personal identification number.

The electronic card can use a diagnostic function (such as an algorithm) to measure at least one parameter (such as checking for battery life) and generate a warning signal that is stored in the transaction specific data packet when a preselected threshold is exceeded.

The electronic card can have a user selection mechanism, such as more than one button (that can be located on the front of the card) that allows a user to select between multiple transaction card functions or handling options, such as whether the card is being used in a given transaction for business or non-business use. A visual display can be used to indicate what transaction card function has been selected. A display can visually display at least a portion of the transaction specific data packet to the user, and such display can be triggered by input from the user.

The electronic card, which may be contained within a telephone, can affix its processor to a flexible printed circuit board, it can use an electronic encoder as a communication device and it does not have to contain n a magnetic stripe.

Accordingly, it is a primary object of the present invention to provide an improved electronic card.

This and further objects and advantages will be apparent to those skilled in the art in connection with the detailed description of the preferred embodiments set forth below.

BRIEF DESCRIPTION OF THE DRAWINGS

FIG. 4 shows an un-coded magnetic stripe likened to a series of aligned South-North magnetic domains.

FIG. 5 shows a sudden introduction of a strong magnet having an opposite orientation on top of a magnetic domain of the magnetic stripe causing flux reversals.

FIG. 9 is a simplified, schematic diagram of one embodiment used to generate a customer one-time unique purchase order number by a customer.

DETAILED DESCRIPTION OF THE PREFERRED EMBODIMENTS

Figure 1:
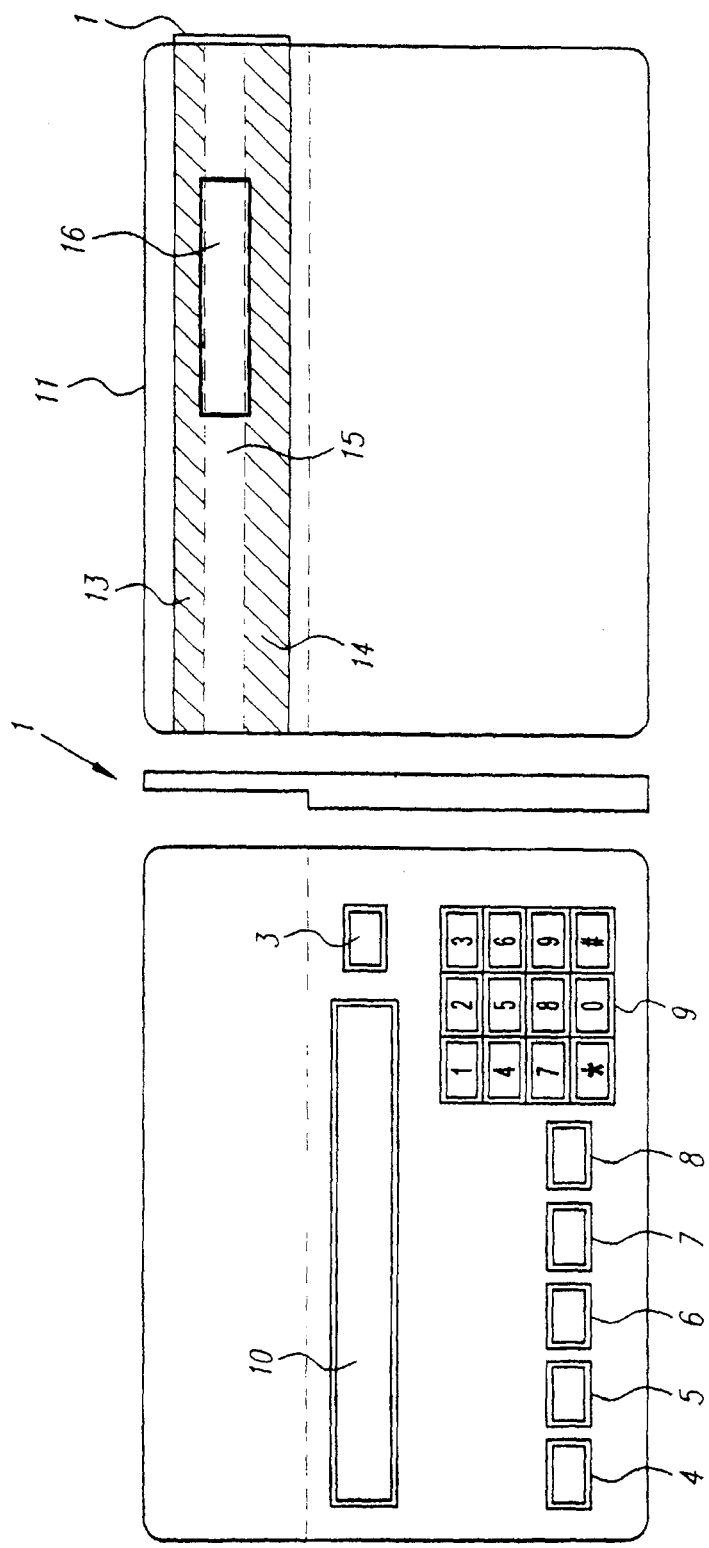
FIG. 1 is a physical layout of a preferred embodiment of a Universal Anonymous Credit Card (UACC) disclosed in U.S. Pat. No. 6,592,044 which is one electronic card useful in accordance with the present invention.

The present invention is related to U.S. Pat. Nos. 5,913, 203, 5,937,394 and 5,956,699, the disclosures of which are all specifically incorporated herein by reference.

U.S. Pat. No. 6,592,044 provides the following disclosure of an electronic card.

A unitary, self-contained electronic device is provided having physical planar dimensions that are essentially identical to those of a conventional magnetic stripe credit card, which is widely used in electronic commerce today. The device has seven basic components, although it is possible to combine some of these components together.

The first component is the card base. The other components, in one way or another, are attached to this base.

The second component is a computer. It is preferable that the computer be a single integrated chip, but it need not be. A computer typically contains a central processing unit connected to both storage memory and random access memory (RAM). RAM is used to load and run application programs as well as for storing data during run time. The storage memory can hold a variety of computer programs.

The third component is a display controlled by the computer. In the preferred embodiment, this is a liquid crystal display (LCD). The LCD can be controlled by a LCD driver, and the LCD driver can be contained in storage memory of the computer. In an alternative embodiment, the third component could be an electronic ink display, which is a novel and newly available display medium. The electronic ink display can be fabricated with highly flexible physical dimensions, especially in thickness, which is likened to a thin piece of paper and also much cheaper to manufacture than conventional LCD display.

The fourth component is an input mechanism. In the preferred embodiment, this is a keypad. However, it is possible that the input mechanism might rely upon voice recognition as this technology becomes more and more developed.

The fifth component is a magnetic storage medium. In the preferred embodiment, this is a magnetic stripe.

The sixth component is an encoder for generating a data packet that is stored in a designated portion of the magnetic storage medium. This component is what allows the electronic device to be dynamic by relying upon an input to generate the data packet.

The seventh component is a power source. In the preferred embodiment, this is a battery or a solar cell.

A primary function of this electronic device, which shall be referred to as the Universal Anonymous Credit Card (UACC), is to allow a credit cardholder to execute secure and anonymous credit card transactions on and off the Internet in accordance with the teachings of U.S. Pat. No. 5,956,699. This can be done in a system and in methodology in which merchants no longer have access to the cardholder's real name, address and the actual valid credit card number. Such an effectual personal encryption does not, however, prevent the additional use of an Internet standard encryption such as SSL or SET for online data exchanges. The latter will simply make such online transactions even more secured.

For purposes of clarification and illustration, an example of an application that uses the methodology taught in U.S. Pat. No. 5,956,699 is presented here. Assume that the valid credit card number (VCCN) and the PIN number are, respectively: VCCN=4678 0123 4567 8012 1200 PIN=2468

Next, assume that the application uses an algorithm that first deletes four (4) digits from the VCCN and then inserts in their place the PIN according to the insertion sequence indicated by a so-called PIN Sequence Insertion Number (PSIN) in order to come up with the scrambled Anonymous Credit Card Number (ACCN), also containing 20 digits. The 4-digit PSIN number can either be chosen by the cardholder or assigned by the issuer. Let us assume for this example that the cardholder's PSIN is 1357.

Next, assume that the algorithm only operates on digits 5 through 6 of the VCCN. This takes into account the fact that the first 4 digits of the standard VCCN denote the identification of the credit card issuer and the last 4 digits of the standard VCCN are reserved for the expiration date, all of which should be left undisturbed. Thus, it is the middle 12 digits that indicate the account number for the cardholder of the VCCN. Therefore, the algorithm calls for the cardholder to first delete the last four digits of the 12-digit account number. In this example the 4 digits to be deleted will be "8012". The 8-digit number before the cardholder PIN is inserted according to the cardholder's PSIN is "0123 4567".

Now the algorithm defines the numbering convention of the digit positions in the ACCN. The first digit position is defined as the zeroth ($0^{th}$) and the second is the first ($1^{st}$) etc. Thus, according to the PISN 1357, the PIN 2468 should be inserted to form the ACCN as follows: ACCN=4678 021426384567 1200

The 4 digits of the PIN=2468 occupy, respectively, the $1^{st}$, $3^{rd}$, $5^{th}$ and $7^{th}$ positions (according to PISN=1357) using the defined digit position numbering convention. In a simpler algorithm for inserting the PIN, the PIN number itself can act effectively as the PSIN so that the cardholder does not have to remember two numbers. Using such an algorithm, in the example above, the ACCN will now be: ACCN=4678 012243648567 1200

The 4 digits of the PIN=2468 also occupy, respectively the $2^{nd}$, $4^{th}$, $6^{th}$ and $8^{th}$ positions of the ACCN (according to an implicit PSIN=PIN=2468) using the defined digit position numbering convention.

The applications of the teachings of U.S. Pat. No. 5,956,699 just described can be used in a system that reduces fraud while protecting consumer privacy through anonymous transactions, on and off the Internet. Such a system has three main components that are provided to complete a commercial credit card transaction. First, instead of using a valid credit card number, an ACCN is used. Second, instead of using the cardholder's real name, an alias is used. The alias can be selected by the cardholder or the issuer of the credit card, but it has to be known by both. Third, instead of using a cardholder's real address, a "Proxy Agent" is used to conceal the cardholder's actual address and still comply with current credit card transaction regulations. In such a system, the use of a credit card for transactions on the Internet can be anonymous to all except the cardholder and the credit card issuer.

In order to reduce the cost of use of the UACC, and increase the range of applications in which it can be used, the UACC should have a magnetic storage medium that can be read by a standard magnetic stripe reader. This means that the magnetic storage medium must be capable of being read by a standard magnetic stripe reader. It also means that the portion of the UACC containing the magnetic storage medium must be sized such that the magnetic storage medium will work with standard magnetic stripe readers. A standard magnetic stripe reader works by passing the magnetic stripe portion of a card, such as a credit card, through the magnetic stripe reader in a swiping motion. Standard magnetic stripe readers have been prevalent in retail stores throughout the United States for many years.

An especially preferred embodiment of the UACC will now be described in even greater detail. The especially preferred embodiment uses a standard microprocessor having its usual Central Processing Unit (CPU), Read-Only-Memory (ROM), Random-Access-Memory (RAM) and Input-Output devices (I/O). There are two types of ROMs in the UACC. The first type is a standard semiconductor ROM, ROM1, fabricated as part of the microprocessor. ROM1 stores the microprocessor operating system and also the bulk of the methodology software. The second type of ROM, ROM2, is a portion of a magnetic stripe, namely Tracks 1 and 3. ROM2 stores the relevant information about the cardholder such as primary account number VCCN, name, expiration date, encrypted PIN etc. There are also two types of RAMs in the UACC. The first type of RAM, RAM1, is a standard semiconductor RAM as part of the microprocessor and needed for its normal operation. The second type of RAM, RAM2, is a portion of a magnetic stripe, namely Track 2. RAM2 temporarily stores the encoded ACCN to be read by a standard magnetic stripe reader during a normal credit card transaction after the cardholder inputs the PIN according to the PSIN algorithm into the UACC.

The methodology software is installed into ROM1 of the microprocessor during production. A standard parallel port Input Device serves to interface a numeric keypad and other functional switches of the UACC to the microprocessor. The UACC also has two Output Devices. The first Output Device is a standard parallel output port of the microprocessor used for interfacing to it a 10- or more character alphanumeric LCD display through a driver for outputting information such as recalling from memory alias or typed in PIN verification. It is also used for production testing and repair or servicing of the UACC. The second Output Device is an integrated circuit (IC) magnetic encoder unit built into the UACC so as to encode Track 2 of the magnetic stripe or RAM2, either statically in conjunction with the existing magnetic stripe, or dynamically without the use of the existing magnetic stripe, with the temporary ACCN information for off the Internet credit card transactions. In this especially preferred embodiment of the present invention illustrated below, only the static magnetic encoder working in conjunction with the existing magnetic stripe is described in detailed. For those skillful in the art, the dynamic thin film magnetic encoder, working without the use of the existing magnetic stripe, can also be used in the present invention as an alternative embodiment. In a preferred embodiment of the present invention, the UACC also contains a battery cell, ON/OFF and other functional switches to render it a fully functional and self-contained credit card (see FIG. 1).

The UACC bridges the old economy world of brick and mortar to the new economy world of the Internet. The integrated circuit (IC) magnetic encoder with current-carrying conductive writing heads is fabricated on a flexible and ultra-thin polymer (e.g. polyimide) printed circuit board (PCB) intimately in contact with the magnetic stripe located above for data impression. The encoder driver and digital logic chips are also mounted on the flexible PCB, but in different areas to form the complete IC magnetic encoder. The IC magnetic encoder is technically compatible with conventional magnetic data transfer methodology and makes possible the fabrication of the present UACC with physical dimensions exactly like those for a regular magnetic stripe portion of a credit card.

When the UACC is used in a retail transaction, by merely entering one's own PIN into the UACC prior to giving it to the merchant for swiping the credit card transaction, one takes full advantage of the secure and anonymous transaction afforded by the UACC. The user can first check his or her alias and entered PIN (note that the PIN is never stored in the UACC) using the LCD display on the UACC before the UACC is handed it over to the merchant. Since the cardholder has in effect already signed the transaction with a digital signature (his or her PIN), no additional hand signature is required to complete the transaction. The merchant only need receive the PIN-modified anonymous credit card number (ACCN) and the user's alias. The ACCN and the alias are read by a conventional magnetic stripe reader and are processed in exactly the same fashion as a conventional credit card number and credit cardholder name since such information can be sent to a credit card approval agent for approval of the transaction. The credit card approval agent has all of the information necessary to determine if the transaction is valid or fraudulent. The identity of the entity who authorized the credit card, as well as it expiration date, is available in the ACCN in just the same manner as it is available in a conventional credit card transaction. The card number is verified by confirming the card number contained in the ACCN as valid for the alias.

To use the UACC for Internet transactions, a cardholder first enters the PIN into the UACC exactly like that for off the Internet transactions. Next, the cardholder continues the transaction using only the cardholder's alias, the ACCN appearing in the LCD display and also the cardholder's choice of trusted delivery (optional) should the cardholder prefer to make this transaction completely anonymous. Thus, by carrying just one UACC which looks and feels exactly like a regular magnetic stripe credit card, one is now able to make old world credit card transactions like one always has done in the past. But, more importantly, one can now use the same UACC for making secure and anonymous transactions, anywhere in the world, and for both on and off the Internet transactions.

The especially preferred embodiment of a UACC will now be described in even greater detail by reference to FIGS. 1 through 3.

FIG. 1 shows the physical layout for an especially preferred embodiment of the Universal Anonymous Credit Card (UACC) 1. The areal dimensions of the UACC 1 are 3.375".times.2.125" or exactly those of a regular magnetic stripe credit card in use in electronic commerce today. The thickness of the UACC 1 varies from .about.0.030" at the top where the magnetic stripe resides to 0.030"-0.060" for the rest of the card dependent upon the thickness of the LCD used (see FIG. 1). Besides the ON/OFF switch 3, the front side 2 of this UACC 1 has five (5) more functional switches, 4-8, labeled and defined as follows: ATM (switch 4)=Reserved for Automatic Teller Machine (ATM) card ACC (switch 5)=Reserved for Anonymous Credit Card (ACC or A-Card) IC (switch 6)=Reserved for Internet Type II Cash MC (switch 7)=Reserved for standard Magnetic Stripe Credit Card BC (switch 8)=Reserved for A-Card transactions using bar codes.

In addition to the switches 3-8, there is a 12-character keypad 9. The primary function of the keypad 9 is for the cardholder to enter the PIN into the UACC 1 for generating the ACCN for on and off Internet commerce transactions. There is also a 10- or more character alphanumeric liquid crystal display (LCD) 10 on the front side 2 of the UACC 1. This LCD 10 displays the alias and the ACCN for use for Internet commerce transactions or the alias and bar code representing the ACCN after the cardholder's PIN is entered. The display of the ACCN will automatically erase itself after about 2 minutes to avoid exposing significant information to third parties.

At the top of the back side 11 of UACC 1 is a standard 3-track magnetic stripe 12 found in every common magnetic stripe credit card in use today. Track-1 13 and track-3 14 are used to store the relevant information about the cardholder such as primary account number VCCN, name, expiration date, encrypted PIN etc. Track-2 15 of the magnetic stripe 12 normally contains only the cardholder's VCCN to be read by a magnetic stripe reader at the merchant's site. For the present UACC device, the ACCN, instead of the VCCN, will be generated on command by entering the PIN with the appropriate function switch "MC" 7 by a special encoder 16 located at a designated location underneath the magnetic strip 12. As will be explained in more detail below, the generated ACCN which resides temporarily on Track-2 15 of the magnetic stripe 12 will disappear automatically 2 minutes after it is being generated. This is to ensure that no significant information about the credit card account stays long enough for fraudsters to steal for committing subsequent credit card frauds.

Figure 2:
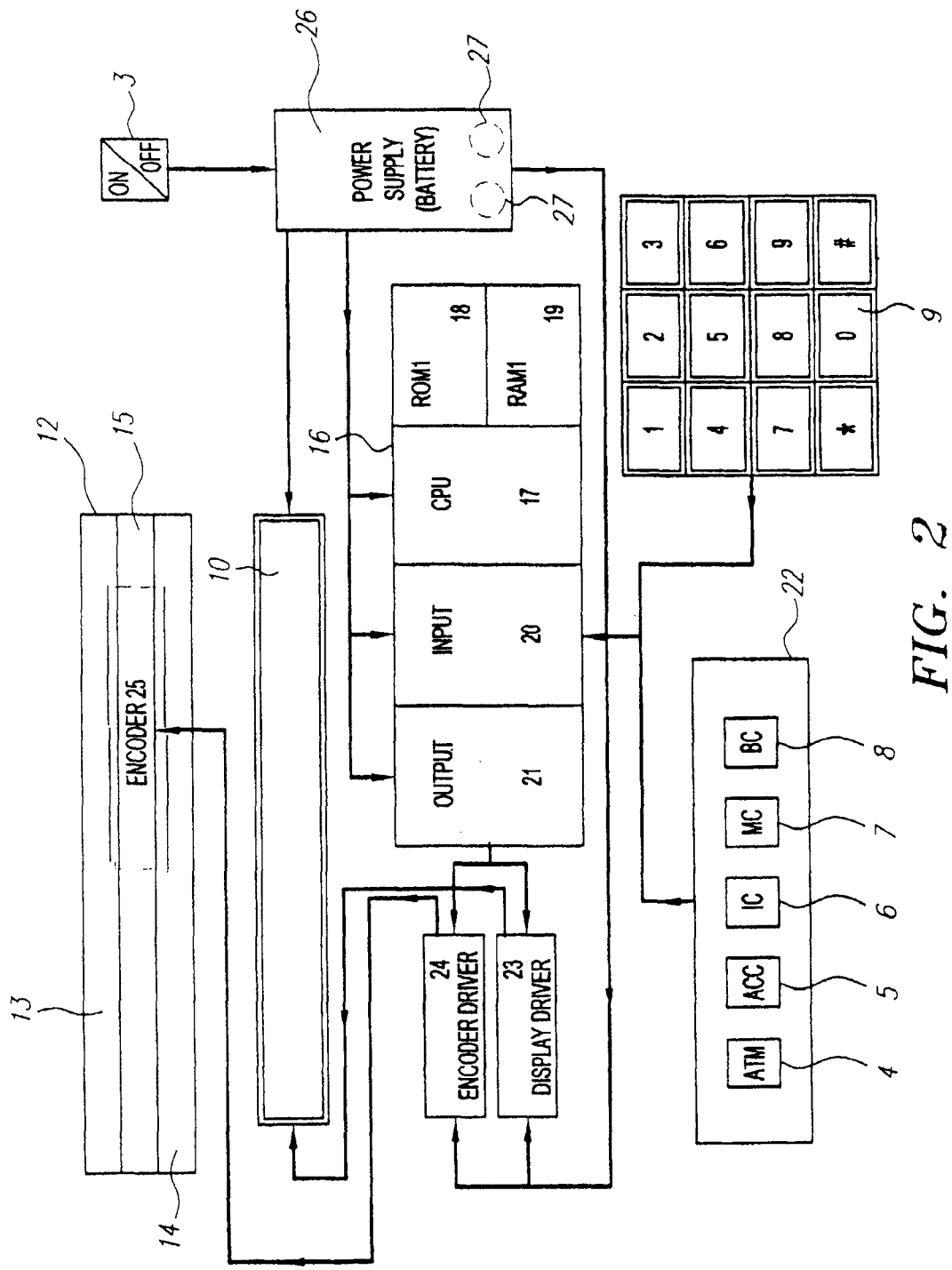
FIG. 2 is a system block diagram of a preferred embodiment of the Universal anonymous Credit card (UACC) useful in accordance with the present invention.

The system block diagram for the especially preferred embodiment of the present invention is shown in FIG. 2. At the center of the system is a conventional 16-bit microprocessor 16 comprising a Central Processing Unit (CPU) 17, a Read-Only-Memory (ROM1) 18, a Random Access Memory (RAM1) 19, a 16-bit parallel Input Port (Input) 20 and a 16-bit parallel Output Port (Output) 21. The microprocessor 16 receives inputs through Input 20 from a bank of functional switches 22, which contains switches 4 through 8. The microprocessor also receives inputs from a 12-character keypad 9 through Input 20. Outputs from the microprocessor 16 emanate from Output 21 through a LCD display driver 23 to reach the 10- or more character alphanumeric LCD display 10 and also through an encoder driver 24 to reach a designated location of Track-2 15 of the magnetic stripe 12. Such a designated location of Track-2 15, where the encoder 25 is positioned, serves as a second RAM, RAM2, for the microprocessor 16. RAM2 stores the encoded ACCN needed for offline credit card transactions to be read by the merchant's standard decoding equipment very much like a conventional magnetic stripe credit card.

The software program for implementing the methodology provided by U.S. Pat. No. 5,956,699 for the cardholder to execute secured and anonymous credit card transactions on and off the Internet is installed into ROM 118 of the microprocessor 16 during production of the current UACC unit. Information pertaining to the cardholder is encoded onto Track-1 13 and Track-3 14 of the magnetic stripe 12 which serves as an independent ROM, ROM2, for the UACC unit. Since information stored in ROM2 will be read with a standard magnetic stripe reader, it operates independently of the microprocessor 16. A battery supply 26 with contacts 27, controlled by the ON/OFF switch 3, completes the UACC system. The battery supply provides power to all the components of the UACC system, including the microprocessor 16, LCD display driver 23, encoder driver 24, LCD display 10 and the keypad 9.

Figure 3:
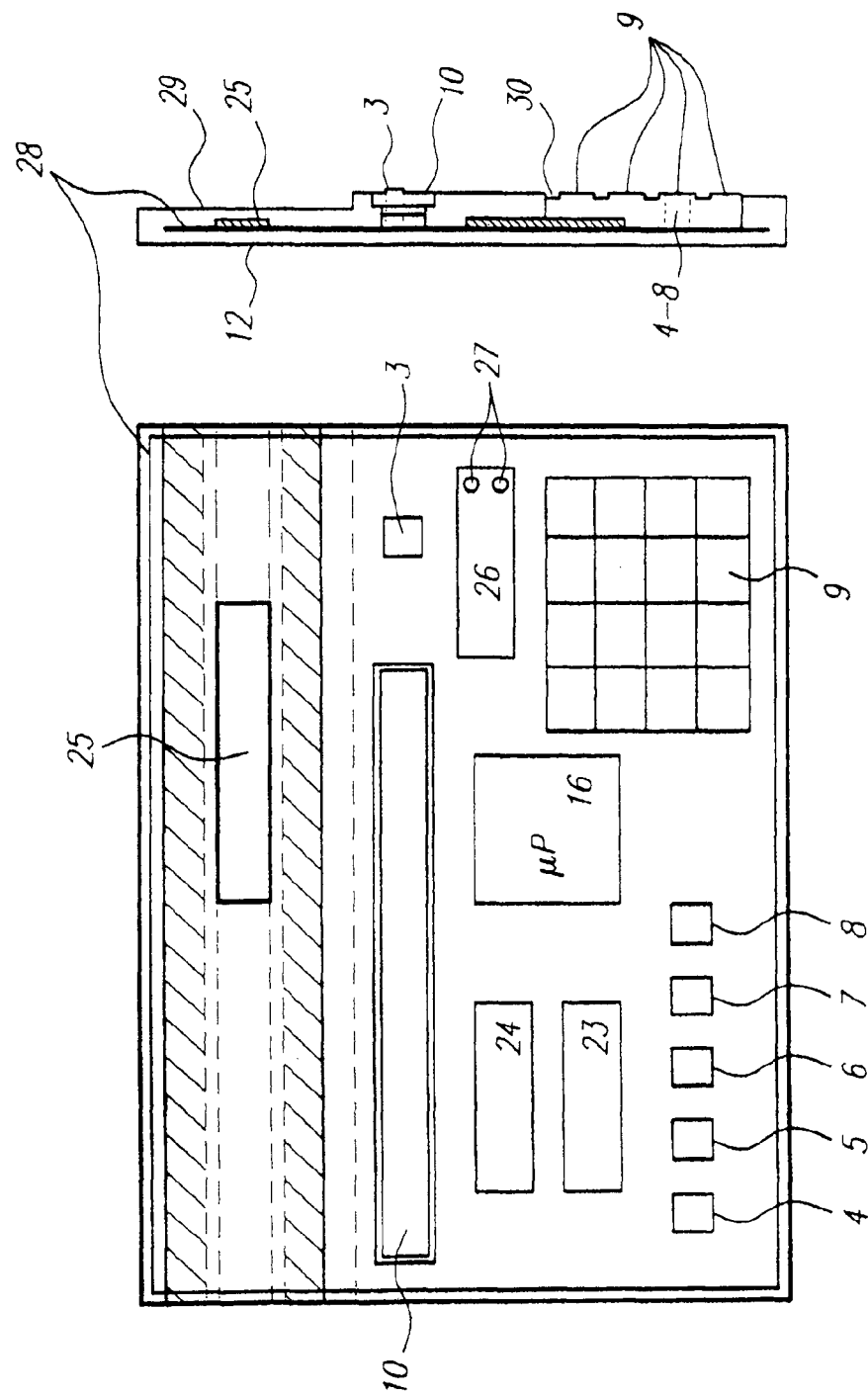
FIG. 3 is a physical layout of a preferred embodiment of the Universal anonymous Credit Card (UACC) useful in accordance with the present invention.

FIG. 3 shows the physical layout and construction for the especially preferred embodiment of the present UACC device. All the electronic components of the system, namely the microprocessor 16, the LCD display 10, the keypad 9, LCD display driver 23, encoder driver 24, encoder 25, functional switches 4-8, ON/OFF switch 3 and battery contacts 27 with battery cell 26, are fabricated on a flexible multi-layered printed circuit board 28. The flexible printed circuit board 28 with all the loaded components is then encapsulated in plastic into thin 29 and thick 30 parallel sections as shown in FIG. 3. The thickness of the thin section 29 where the conventional magnet stripe 12 will be fabricated on top of the encoder 25 (to be explained in more detail below) on the backside is about 0.030", the same thickness as the magnetic stripe credit cards in use today. The plastic encapsulated thick section 30 (see FIG. 3), while holding the fully-loaded flexible printed circuit board 28 in place, allows the ON/OFF switch 3, functional switches 4-8 and the keypad 9 to be physically accessible (e.g. by fingers) from the front side of the UACC device. The LCD display 10 is also directly visible from the front side. Note that the thickness of the plastic encapsulated section would also be 0.030" thick if a polymer-backed (e.g. Mylar™) ultra-thin LCD display (0.020" thick typical) is used.

A much simplified theory on magnetic stripe technology, especially on how to encode (write) and decode (read) digital data respectively on and off a magnetic stripe used in ordinary credit cards of today, will now be provided in order to better explain how an encoder can be fabricated and work. A magnetic stripe is made out of a thin layer of very tiny ferromagnetic particles (typically 0.5 micron long) bound together with resin and subjected to a very strong magnetizing magnetic field (known as "coercivity") when such a stripe is printed onto a substrate. When the resin is cured or set, these tiny "magnets" are magnetically and permanently aligned (magnetized) into a series of South-North magnetic domains forming a chain of S-N, S-N . . . interfaces. The adjacent N-S magnetic fluxes of these magnetic domains are normally linked together for the entire magnetic stripe to act like a single magnet with South and North poles at its ends. In other words, an un-encoded magnetic stripe is actually a series of aligned South-North magnetic domains (see FIG. 4).

Figure 6:
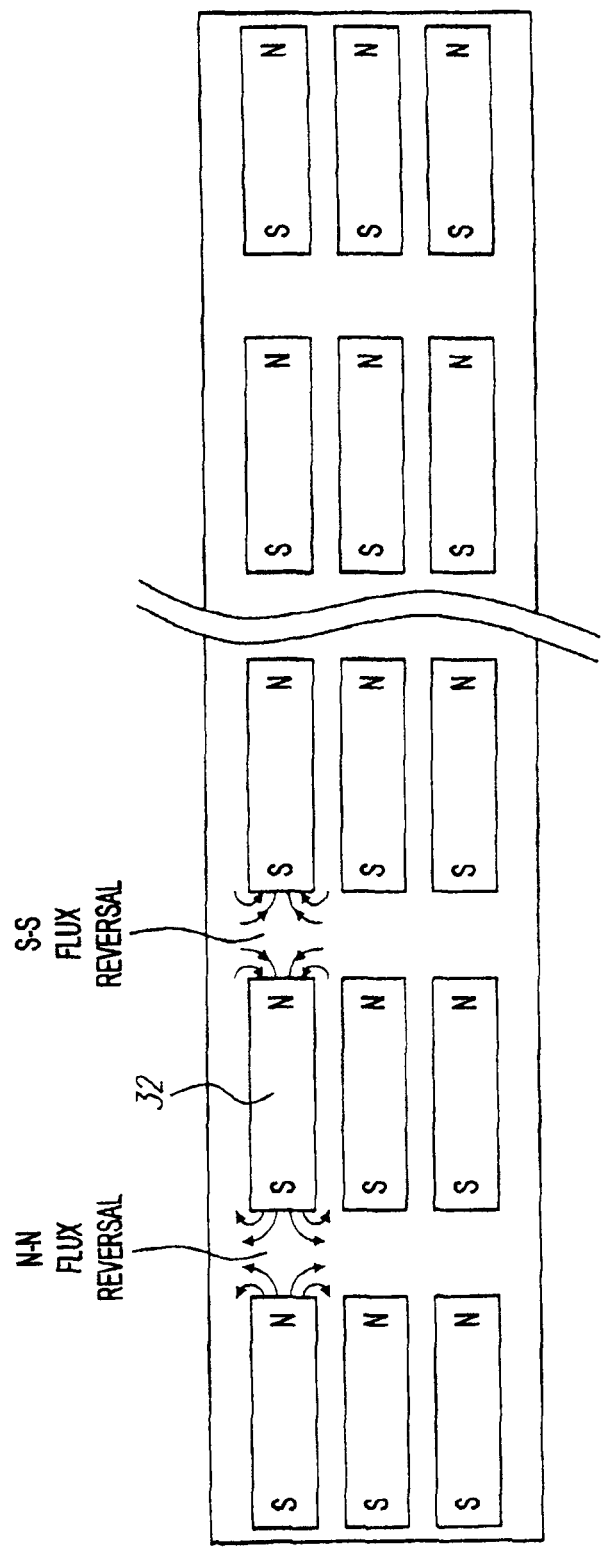
FIG. 6 shows flux reversals caused by sudden introduction of strong magnet having opposite magnetic orientation on top of a magnetic domain in a magnetic stripe.

If a N-N interface (instead of the normal N-S interface for un-encoded magnetic domains) is created somewhere on the stripe, the magnetic fluxes at the N-N interface will repel each other, resulting in a concentration or increase of flux lines around the N-N interface called a "flux reversal". The same situation exists for a S-S interface as compared with a normal N-S interface. Such a situation will take place if a strong magnetizing magnet 31 having an opposite magnetic orientation, namely N-S, is suddenly introduced on top of one of the S-N magnetic domains 32 of the magnetic stripe as shown in FIG. 5. The magnetic domain 32 will realign its magnetization as that of the strong magnet on top of it, namely N-S. Under this situation, two flux reversals have taken place, as illustrated in FIG. 6.

The process of encoding or writing involves the creation of N-N and S-S magnetic domain interfaces, or flux reversals, and the process of decoding or reading that of detecting them. Knowing that magnetic flux lines always emanate from the North pole and terminate on the South pole, a sudden introduction of a strong magnetic field (greater than the coercivity of the magnetic domains) having a N-S magnetic orientation can magnetize a normal S-N magnetic domain into N-S orientation, resulting in the creation of a pair of flux reversals S-S and N-N, much like that shown in FIG. 6 above.

Before proceeding to explain how the encoder of the especially preferred embodiment writes the ACCN on Track-215 of the magnetic stripe 12, it is helpful to delve deeper into the data storage mechanics of the magnetic stripe 12 itself. As stated earlier, the magnetic stripe 12 has three tracks, namely Track-113, Track-215 and Track-314. Digital data are stored in these three tracks according to the American National Standards Institute (ANSI) and International Standards Organization (ISO) BCD (5-bit Binary Coded Decimal Format) or ALPHA (alphanumeric) standards. The ANSI/ISO standards for Tracks 1, 2 and 3 are summarized in Table I as follows:

TABLE I

ANSI/ISO Track 1, 2, 3 Standards

| Track | Name | Density | Format | Characters | Function |
|---|---|---|---|---|---|
| 1 | IATA | 210 bpi | ALPHA | 79 | Read Name & Account |
| 2 | ABA | 75 bpi | BCD | 40 | Read Account |
| 3 | THRIFT | 210 bpi | BCD | 107 | Read Account & Encode |

Track-1 13, named after the "International Air Transport Association" (IATA), contains the cardholder's name as well as account and other discretionary data. Track-2 15, "American Banking Association" (ABA), is the most commonly used. This is the track that is read by ATMs and credit card checkers. The ABA designed the specifications of this track and it is believed all major world banks abide by it. It contains the cardholder's account number, encrypted PIN, plus other discretionary data. Track-3 14 is unique and intended to have data read from and written on it. At present, it is an orphaned standard and has not been widely used to date.

Before the encoder can write on command the ACCN on Track-2 15 of the magnetic stripe, attention must be paid to the data layout for Track-2 15. Encoding protocol specifies that each track must begin and end with a length of all Zero bits, called CLOCKING BITS. These are used to synchronize the self-clocking feature of bi-phase decoding, an industry standard. A typical Track-2 layout is shown as follows:

0000000000000000;
1111222233334444=9912****000000XXXX0000?
The symbol ";" after the "0's" is the "START SENTINEL" according to the BCD data format. The 4 digits "1111" following is the issuer or acquiring bank's identification number. The 12 digits following is the cardholder's account number. The symbol following is the "FIELD SEPARATOR" according to BCD data format. The 4 digits "9912" following is the expiration date. The four characters following "****" are data reserved for private use. The data length "XXXX" after the string of 0's may vary and is the encrypted PIN offset. Finally the symbol "?" after another string of 0's is "END SENTINEL".

The location of the 12 digits that need to be encoded or written on command is represented by "2222 33334444" on Track-215 of the magnetic stripe 12 in the example cited above.

Next, it is helpful to have an understanding of how the 12 digits are represented in BCD data format on Track-215 of the magnetic stripe 12. According to the BCD data format, each decimal digit is coded by 5 bits. The ANSI/ISO BCD Data Format is reproduced in Table II below. Note that all 21 digits, including the field separator, namely "1111222233334444=9912", can also be encoded on command if so desired.

TABLE 2

ANSI/ISO BCD Data Format

| Data Bits | | | Parity | | | |
|---|---|---|---|---|---|---|
| b1 | b2 | b3 | b4 | b5 | Character[1] | Function |
| 0 | 0 | 0 | 0 | 1 | 0 (0 H) | Data |
| 1 | 0 | 0 | 0 | 0 | 1 (1 H) | Data |
| 0 | 1 | 0 | 0 | 0 | 2 (2 H) | Data |
| 1 | 1 | 0 | 0 | 1 | 3 (3 H) | Data |
| 0 | 0 | 1 | 0 | 0 | 4 (4 H) | Data |
| 1 | 0 | 1 | 0 | 1 | 5 (5 H) | Data |
| 0 | 1 | 1 | 0 | 1 | 6 (6 H) | Data |
| 1 | 1 | 1 | 0 | 0 | 7 (7 H) | Data |
| 0 | 0 | 0 | 1 | 0 | 8 (8 H) | Data |
| 1 | 0 | 0 | 1 | 1 | 9 (9 H) | Data |
| 0 | 1 | 0 | 1 | 1 | : (AH) | Control |
| 1 | 1 | 0 | 1 | 0 | ; (BH) | Start Sentinel |
| 0 | 0 | 1 | 1 | 1 | < (CH) | Control |
| 1 | 0 | 1 | 1 | 0 | = (DH) | Field Separator |
| 0 | 1 | 1 | 1 | 0 | > (EH) | Control |
| 1 | 1 | 1 | 1 | 1 | ? (FH) | End Sentinel |

[1]Hexadecimal conversions of the data bits are given in parentheses (xH).

How BCD data is actually encoded onto Track-2 15 of the magnetic stripe 12 can now be explained. Table I above notes that Track-2 has a density of 75 bits per inch (bpi). According to the ANSI/ISO BCD data format, each character is represented by 5 bits. Thus, if the encoder needs to encode 12 digits (see "222233334444" in example above), it will require a total of 60 bits. Since the density is 75 bpi, the maximum physical space available for a stationary encoder head is 0.800". But the important dimension for the design of the encoder head is the space available for each BCD bit. In the present case, the bit dimension is 1,000 mils/75 bits or 13.33 mils (0.0133") per bit.

At this point, it is useful to explain with the help of FIGS. 7 A-D, how a single character or decimal digit comprising 5 bits in the ANSI/ISO BCD data format is encoded onto Track-2 15 of the magnetic stripe 12. FIG. 7A shows an un-encoded strip of Track-2 long enough to accommodate 5 bits of data. The physical length of this strip is 5.times.0.0133" or 0.0667" (66.65 mils). This un-encoded strip is divided into five segments, each representing a single bit, and each is further represented by two magnetic domains as shown in FIG. 7A. In accordance with the industry standard of encoding called Aiken Biphase, or "two frequency coherent-phase encoding", data is encoded in "bit cells" defined above and the frequency of which is the frequency of the '0' signals. '1' signals are exactly twice the frequency of the '0' signals. So, at least from the conventional way of decoding, the actual frequency of the data passing the 'READ' head will vary with the swipe speed, for the data density, control functions etc., the '0' frequency, however, will always be twice the '0' frequency. This is illustrated in FIG. 7B where the representation of all '1s', all '0s' and how '1' and '0' data exist side by side. Note that in FIG. 7B, the bit cell waveforms for '0' and '1' are the results of creating the so-called flux reversals of "N-N" or "S-S" at the magnetic domains interfaces of the un-encoded strip. For the stationary encoder of the present preferred embodiment, the encoding must be consistent with the Aiken Biphase convention because the same 'READ' heads will be used to decode the Track-2 data temporarily stored in UACC devices during offline (off the Internet) credit card transactions.

Figure 7A:
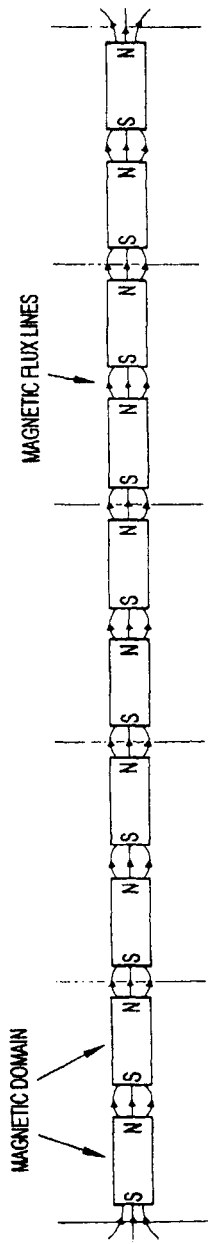
FIG. 7A is an un-coded portion of a track of a magnetic stripe having 5 bit cells showing no flux reversals.
Figure 7B:
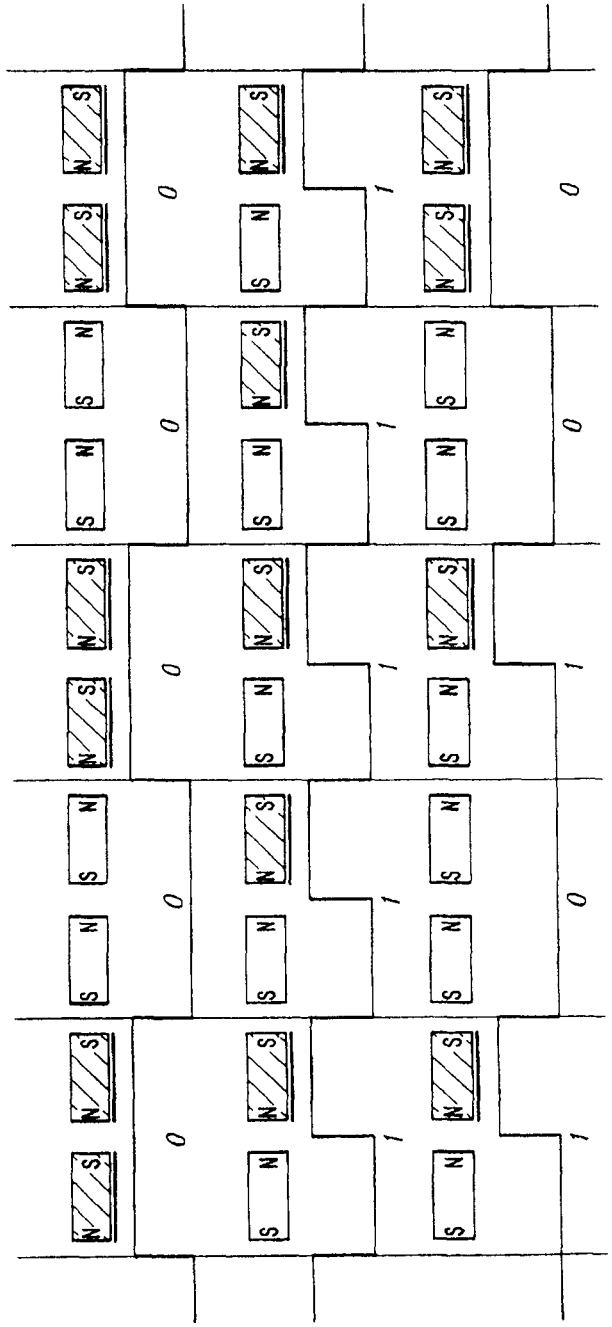
FIG. 7B shows a representation of all "0", all "1" and "0" and "1" side by side according to the Aiken Biphase encoding code.
Figure 7C:
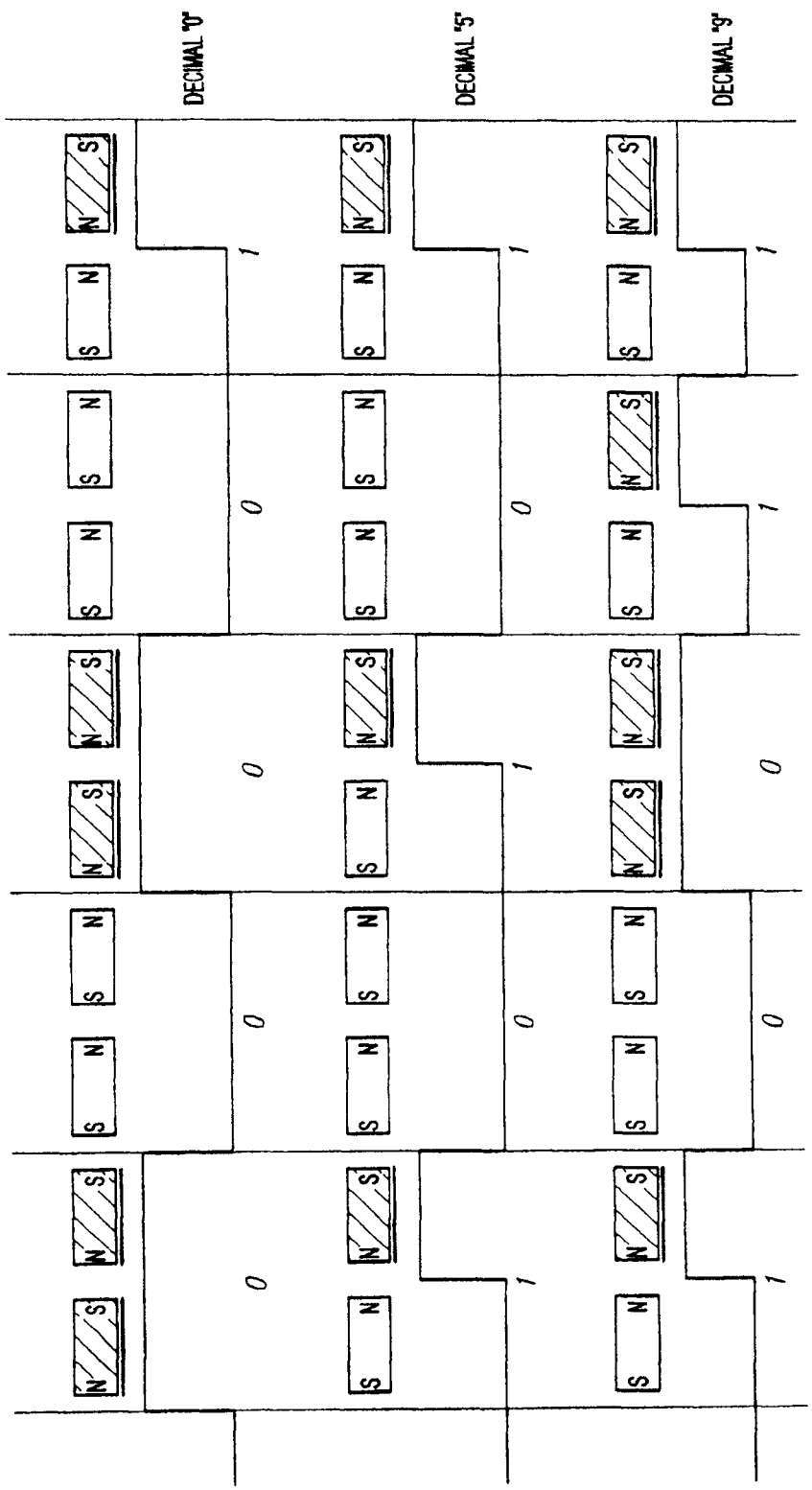
FIG. 7C shows a representation of decimals "0", "5" and "9" in the Aiken Biphase encoding standard.
Figure 7D:
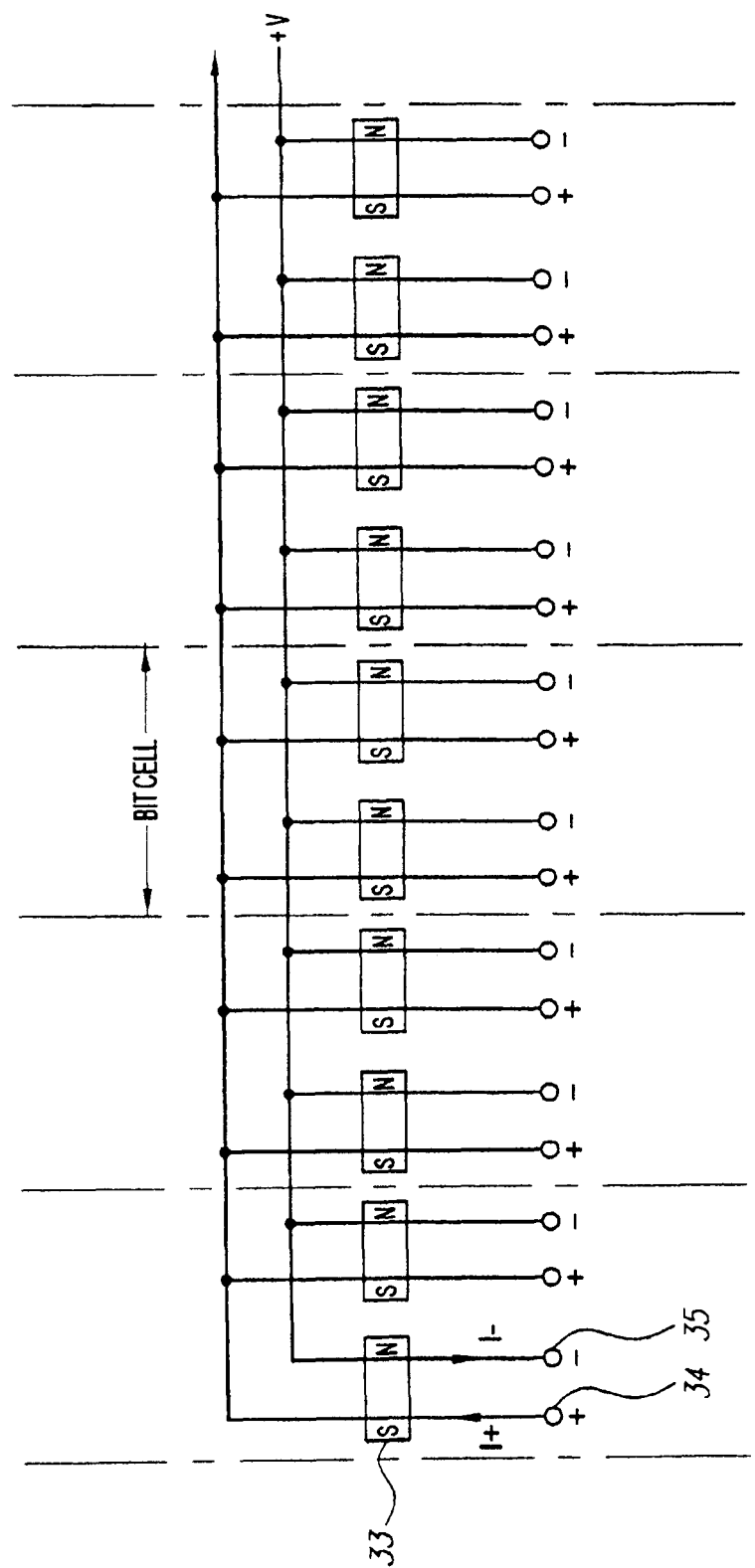
FIG. 7D shows one embodiment of an encoder head of the present invention.

Consistent with the Aiken Biphase convention therefore, FIG. 7C shows, as an illustration, how BCD decimal digits '0', '5' and '9' would appear referenced to the un-encoded 5-bit strip of FIG. 7A. Also shown in FIG. 7C are the orientation of the magnetic domains and the flux reversals at the domain interfaces. Thus, if an encoder head of the present preferred embodiment is designed to be on top of the 10 magnetic domains representing the 5-bit decimal digit, it would be possible to magnetize on command the individual domains in order to create the appropriate flux reversals corresponding to the desired decimal digit. This is illustrated in FIG. 7D. The orientation of the magnetic domain 33 when un-coded is S-N as shown in FIG. 7D. The two contact bits 34 and 35 control which direction the magnetizing current is flowing. When 34 and 35 are suddenly made "1" and "1", current I+ will flow in from contact 34 to ground resulting in flipping the orientation of magnetic domain 33 to N-S. Meanwhile the current I− from "+V" to contact 35 is zero. When contact 34 and 35 are suddenly left open circuited, both I+ and I− are zero and the orientation of magnetic domain 33 will stay as N-S. When contacts 34 and 35 are suddenly changed to "0" and "0", current I− will flow from "+V" to contact 35 and cause the magnetic domain to revert back to S-N while I+ is zero. No domain flipping occurs if the bits for contacts 34 and 35 are either "1" "0" or "0" "1". In the former case, the magnetizing effect of I+ is neutralized by I−. Both I+ and I− are zero for the latter case. The magnitudes of currents I+ and I− needed to flip the magnetic domains with coercity of the order of 300-500 gausses ("soft" magnetic stripe found in conventional credit cards) for current carrying conductor of 1-2 microns thick are several hundred milliamperes. The electrical power required to encode or decode 12 decimal digits is of the order of tens microwatts.

In order to encode in the present example a total of 12 decimal digits, one would need to encode 5.times.12 or 60 bits of data. As shown in FIG. 7D, the encoder has to have two micro-heads per bit of data. Furthermore, each micro-head has a PLUS or MINUS polarity. If the polarity is PLUS, current will flow in one direction so as to generate a N-S magnetizing magnet. Similarly, if the polarity is MINUS, current will flow in the opposite direction so as to generate a S-N magnetizing magnet. So the encoder of the present preferred embodiment will have 2.times.60 micro-heads each with a PLUS and MINUS polarity. An especially preferred embodiment of the encoder with the driver electronics and logic is shown schematically in FIG. 8.

Figure 8:
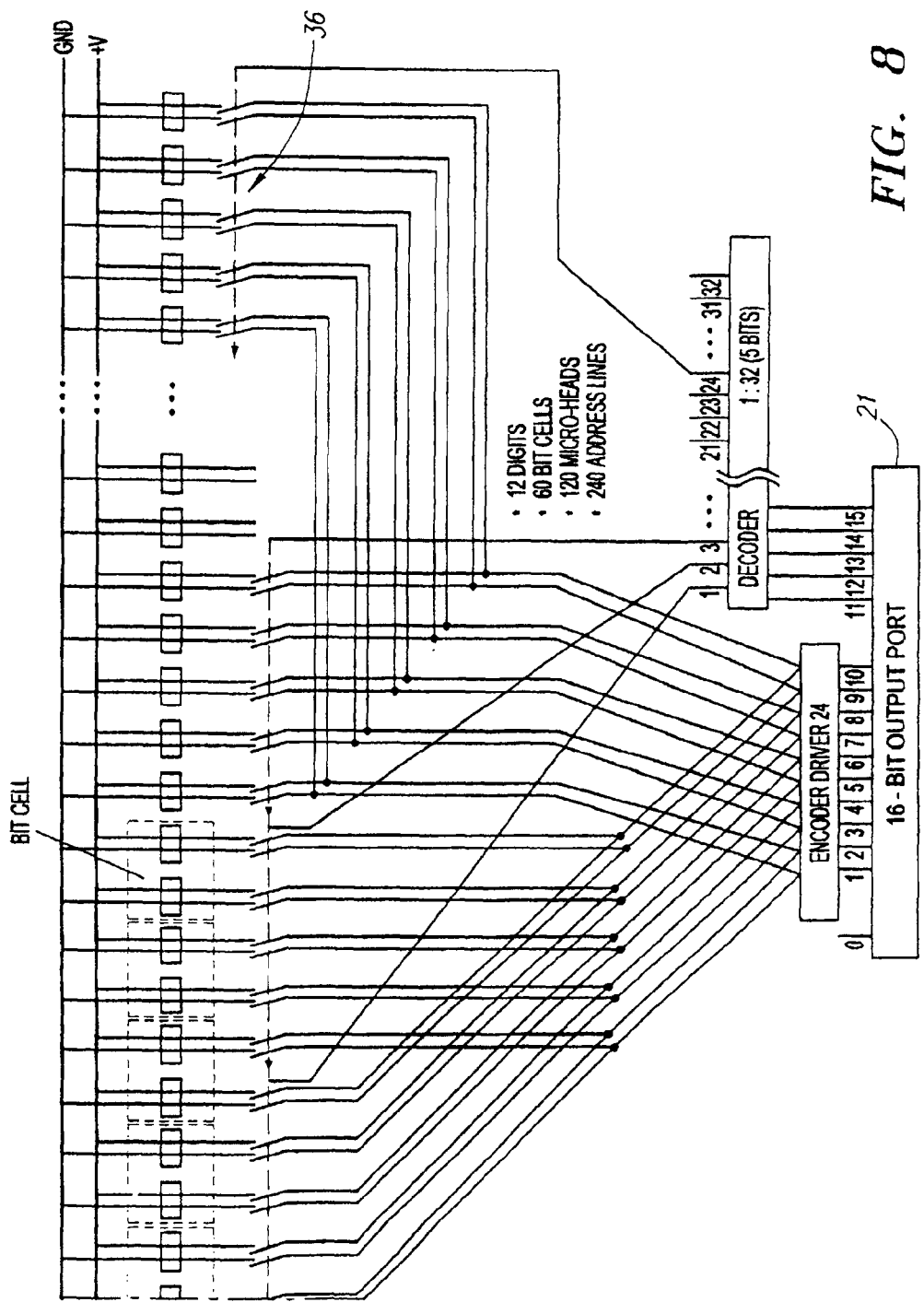
FIG. 8 shows one embodiment of an encoder of the present invention with drive electronics and logic.

FIG. 8 shows the 12 decimal digits divided up into 60 bit cells with each bit cell comprising two magnetic domains and each having a PLUS and MINUS polarity. There are therefore a total of 120 magnetic domains that have to be addressed, each with two polarities, making it a total of 240 address lines as shown in FIG. 8. These addresses lines are accessed in bunches of 10 (5 magnetic domains or 2 1/2 bit cells). The address originates from using 10 bits of the 16-bit Output port 21 (see FIG. 2 of system block diagram for UACC) and then through the encoder driver 24 (also see FIG. 2) as current buffer before being connected to the 24 bunches of 10 address lines. Each of the 24 bunches of 10 address lines is accessed with a 32:1 decoder using five of the 16 bits of the Output parallel port 21. The decoder selects one of the 24 bunches of 10 address lines via switch bank 36 (there is a total of 24 switch banks similar to switch bank 36) comprising 10 switches each. In essence, it is the switch bank that selects which of the 10 address lines out of the 24 bunches that are being connected to the output of the encoder driver 24. Thus, it is possible to encode the 12 decimal digits into a designated location of Track-2 15 of the magnetic stripe with commands from the microprocessor and outputted through the parallel port 21 through the encoder driver 24. Such a software command is part of the methodology algorithm taught in U.S. Pat. No. 5,956,699 and stored in ROM1 (see FIG. 2) of the microprocessor 16. The stored algorithm generates the ACCN or, in essence, a "Coupon" (Customer's one-time unique purchase order number), from the valid credit card number VCCN and the cardholder's PIN when inserted properly into part of the VCCN.

The manner in which the Universal Anonymous Credit Card (UACC) will work under different on and offline transaction circumstances will now be described. It is first assumed that the cardholder has opened an UACC account with an issuer or acquiring bank. The cardholder has turned over a real name, address, personal and financial information to the issuer. In return, the cardholder is assigned a valid credit card number, VCCN, a credit limit, an Alias (chosen by the cardholder) and a proxy agent, and most importantly a cardholder UACC. The issuer has to assign the cardholder a proxy agent to use instead of giving out the cardholder's address in order to comply with the existing credit card transaction regulation. After obtaining a UACC from the issuer, the cardholder is now free to do anything and everything on and off the Internet safely with full assurance that nobody will find out what, where, when and how money is being spent with the UACC card, except its issuer.

The manner in which the cardholder can use his or her UACC to shop on the Internet will now be described. It is possible that not every online merchant will accept the UACC in the beginning, so the cardholder may have to identify those merchants that are partners with the UACC issuer bank. Otherwise, the transactions with the UACC will not be processed properly by the existing infrastructure that processes only conventional credit cards. Suppose the cardholder now wishes to purchase some merchandise from an online merchant who accepts UACC. All the cardholder has to send to the merchant's Web site online is his or her alias, a proxy agent's name assigned to the cardholder by the issuer bank, the ACCN or anonymous credit card number which will be obtained from the UACC (to be explained below), the merchandise and shipment choice. This is completely different from what the cardholder normally has to give out, viz. a real name, address and the valid credit card number, should the cardholder use a regular credit card. To obtain the ACCN from his UACC device, all the cardholder has to do is to first push the button "CC", which is reserved for Anonymous Credit Card transactions, then to enter the cardholder's PIN using the keypad and then the "#" key. In the LCD display, the alias will first be scrolled across the display followed by the 10-digit ACCN. Note that the first six digits (four digits are used to identify the issuer bank and two more digits to designate a specific BIN number) and the last four digits of the ACCN always remain the same as those in the VCCN which signifies the issuer's identification and credit card BIN number, and the expiration date respectively. The cardholder can then use this ACCN to complete the transaction with the online merchant. After the cardholder finishes using the ACCN, he or she can either erase it from the LCD display by pressing "*" followed by "#" in the keypad, otherwise the ACCN will disappear from the LCD display automatically after approximately 2 minutes.

As one can see from this transaction on the Internet using the UACC, the real name and address of the cardholder, including the credit card number itself, never appear on the Internet or even are made known to the merchant. Even though the ACCN or Coupon does appear, together with the alias of the cardholder, across the Internet during the online transaction, this ACCN or Coupon number does not stay the same, according to the methodology of U.S. Pat. No. 5,956,699, but changes automatically after every transaction or use. Thus, unlike all the other credit card transactions on the Internet today, no valid credit card numbers are actually available in transmission for theft by anybody. Only the ACCN or Coupon number will appear on any or all transaction records and that number is useless for any subsequent transactions because it is time variant.

For off the Internet transactions, the UACC behaves just like an ordinary credit card. The only difference is that before one hands over the UACC to the merchant for charging the amount, one enters one's PIN after pushing first the "MC" button on the UACC device, which is reserved for magnetic stripe credit card transactions, and then follows it with a "#" key on the keypad. It is assumed here that the cardholder is satisfied with what is being charged on the credit card before the cardholder, in effect, "signs" it digitally in the transaction. Unlike ordinary magnetic stripe credit cards of today, no personal hand signature is needed for off the Internet transactions with the UACC. By entering the PIN, the UACC automatically encodes temporarily the ACCN onto Track-2 of the magnetic stripe 12. The use of the resultant ACCN or Coupon is likened to the cardholder already signing the credit card with a personal digital signature for the transaction. The rest of the transaction simply follows that of a regular magnetic stripe credit card with the existing credit card processing infrastructure.

Thus, there has been described a Universal Anonymous Credit Card (UACC) device that is capable of allowing the cardholder to execute on and off the Internet secure and anonymous credit card transactions.

The UACC can be used in methods for implementing an anonymous credit card transaction between a user and a merchant as is described in U.S. Ser. No. 09/619,859. An embodiment of such a method is set forth in FIG. 9. In accordance with this embodiment, a user must first establish a user account with a credit source. The credit source may be a bank, a credit card company or any other institution involved with issuance of credit cards or bank debit cards, such as a credit union or other institution, or a money source as described in U.S. Pat. No. 5,913,203. When the user establishes a user account with the credit source, one or more user settlement mechanisms through which the user can pay the credit source for charges and fees billed to the user account will be established. For example, in the case of credit card transactions, the user and the credit source will enter into an agreement concerning use of the credit card. As a further example, in the case of debit or electronic checking services, the user and credit source may enter into a separate agreement concerning how and from what account such debits will be debited.

After a user account is established, the credit source will create one or more user account records associated with the user account to contain a variety of information, including a user account number, a fictitious account name, a "Proxy Agent," a user key and, when applicable, a user insertion key. The fictitious account name can be selected by the cardholder or the issuer of the credit card, but it has to be known by both. The "Proxy Agent" is used to conceal the cardholder's actual address and still comply with current credit card transaction regulations—in other words, it is a fictitious address. Additional information that might typically be contained within such records includes cross references to other accounts, the user's name and the user's billing address. An electronic card, such as the UACC card, uses an algorithm to generate a valid personal charge number.

When the electronic card is used in a retail transaction, by merely entering one's own PIN into the electronic card prior to giving it to the merchant for swiping the credit card transaction, one takes full advantage of the secure and anonymous transaction afforded by the electronic card. The user can first check his or her alias and entered PIN (note that the PIN is never stored in the electronic card) using the keypad on the electronic card before the electronic card is handed it over to the merchant. Since the cardholder has in effect already signed the transaction with a digital signature (his or her PIN), no additional hand signature is required to complete the transaction. The merchant only need receive the PIN-modified anonymous credit card number (ACCN) and the user's alias. The ACCN and the alias are read by a conventional magnetic stripe reader and are processed in exactly the same fashion as a conventional credit card number and credit cardholder name since such information can be sent to a credit card approval agent for approval of the transaction. The credit card approval agent has all of the Information necessary to determine if the transaction is valid or fraudulent. The identity of the entity who authorized the credit card, as well as It expiration date, is available in the ACCN in just the same manner as it is available in a conventional credit card transaction. The card number is verified by confirming the card number contained in the ACCN as valid for the alias.

To use the electronic card for Internet transactions, a cardholder first enters the PIN into the electronic card exactly like that for off the Internet transactions. Next, the cardholder continues the transaction using only the cardholder's alias, the ACCN appearing in the LCD display and also the cardholder's choice of trusted delivery or Proxy Agent (optional) should the cardholder prefer to make this transaction completely anonymous. Thus, by carrying just one electronic card which looks and feels exactly like a regular magnetic stripe credit card, one is now able to make old world credit card transactions like one always has done in the past. But, more importantly, one can now use the same electronic card for making secure and anonymous transactions, anywhere in the world, and for both on and off the Internet transactions.

As is apparent from the foregoing description, the real name and address of the cardholder, including the credit card number itself, never need appear on the Internet or even need to be made known to the merchant. Even though the ACCN or Coupon (Customer One-time Unique Purchase Order Number) does appear, together with the alias of the cardholder, across the Internet during the online transaction, this ACCN or Coupon number does not stay the same, according to the methodology of U.S. Pat. No. 5,956,699, but changes automatically after every transaction or use. Thus, unlike all the other credit card transactions on the Internet today, no valid credit card numbers are actually available in transmission for theft by anybody. Only the ACCN or Coupon number will appear on any or all transaction records and that number is useless for any subsequent transactions because it is time variant.

Accordingly, this disclosure includes the following methods.

Method 1. A method for implementing an anonymous Mail Order Telephone Order ("MOTO") credit card transaction between a user and a merchant, comprising the steps of:

establishing a user account between a credit source and the user which is associated with a fictitious account name, a user account number, a user key and a user settlement mechanism through which the user can pay the credit source for charges and fees billed to the user account;

providing the user with an electronic card that is comprised of:
   a card base;
   a storage medium affixed to the card that can be read by a card reader but is not readable by a human eye;
   a computer affixed to the card;
   an input mechanism for providing input to the computer;
   a display controlled by the computer; and
   a power source for supplying power to the computer;
   wherein the electronic card has a fictitious account name stored in a memory device accessible by the computer, the computer is capable of causing data to be stored in the storage medium and the electronic card is sized such that a standard magnetic stripe reader can read the magnetic storage medium;

completing a MOTO credit card transaction between the user and the merchant in which the user is charged a monetary value by the merchant, comprising the following steps:
   entering the user key into the input mechanism;
   executing an algorithm by the computer that uses the user key and a card number stored in the electronic card as input variables to generate a valid personal charge number;
   visually reading the valid personal charge number from the display;
   providing the valid personal charge number and the fictitious account name to the merchant;
   sending the monetary value, the valid personal charge number and the fictitious account name to a credit approval center that verifies that the valid personal charge number is valid for the fictitious account name and approves the MOTO credit card transaction; and
   sending an approval of the transaction from the credit approval center to the merchant.

Method 2. Method 1 wherein the MOTO credit card transaction is conducted between the user and the merchant over a computer network.

Method 3. Method 1 and the further steps of:
   establishing a user insertion key that is associated with the user account; and
   generating the valid personal charge number from the card number by inserting the user key into the card number through use of the user insertion key and a permutation variable.

Method 4. Method 3 and the further steps of:
   changing the permutation variable from an initial state to a different state; and
   generating a second valid personal charge number from the card number by inserting the user key into the card number through use of the user insertion key and the permutation variable in the different state.

One particular method that can be used to generate a one-time payment card number, which is described in U.S. application Ser. No. 09/659,434, will now be discussed.

The present disclosure is adapted for use in many kinds of financial transactions. For example, it can be used in credit card transactions, bank or debit card transactions, or electronic script transactions. Because of the versatility of this embodiment, it can be used in connection with a wide variety of instruments that can be used in connection with such financial transactions. Thus, it can be used with electronic cards, software programs used in network applications, or telephones (especially telephones used in what is now being referred to as m-commerce, or mobile commerce). Moreover, it can be used whether such transactions are conducted in person, face-to-face, or whether such transactions are conducted by an indirect medium, such as a mail order transaction, a transaction conducted over a computer network (for example, the Internet), or a telephone transaction.

As is the case in most financial transactions, three parties are typically involved in completed financial transactions according to the present invention. A party makes a monetary payment. In the context of the following description, this is the first entity or customer. Another party receives the monetary payment, and this party can be a single party or two or more parties. In the context of the following description, the party or parties that are receiving the monetary payment are referred to as the second entity. Finally, there is at least one party, and usually multiple parties, that serve as intermediaries to allow the customer to transfer monetary value to the second entity. The intermediary group of one or more parties will be referred to in the context of the following description as a money source. Thus, the money source may be one or more banks, a credit card company or any other institution involved with issuance of credit cards or bank debit cards, such as a credit union or other institution, or a money source as described in U.S. Pat. No. 5,913,203 which states, in col. 5, lines 6-17: "Initially, there must be a money source. This is described as a pseudo cash repository, but it does not need to be a single entity. In practice, it can be a single bank, or a single credit card company or a number of affiliated banks (a bank group) or a number of affiliated credit card companies (a card group) affiliated with one or more merchants and set up to do business with one or more money source customers or some other entity or entities that will perform such a function. The pseudo cash repository, in concept, is similar to an entity that issues traveler's checks (for a non-anonymous cash-like transaction) or a money order (for a potentially anonymous cash-like transaction)." U.S. Pat. No. 5,913,203 further states, in col. 6, lines 34-41: "The pseudo cash repository maintains a record of the pseudo cash unit and the fixed monetary value associated with the pseudo cash unit and, in an especially preferred embodiment, can be either a computer or a network of computers that operates as the money source. If the pseudo cash repository relies upon a network of computers, the network can be dedicated or it can be connected by an encrypted two-way communication linkage."

In connection with this embodiment, it is not necessary that the first entity use a real identity, although such an option is also acceptable. Instead, a pseudonym, such as a screen name or an alias, could be used to protect the first entity's privacy and provide additional security.

Although the first entity need not use a real identity, the first entity must establish an account with a money source. When the account is established, the first entity and the money source must agree upon a payment mechanism or protocol. In the case of a credit card or a bank card, this could be done in the same fashion as exists today, and the first entity could select a fictitious account name as is explained in greater detail in co-pending U.S. patent application Ser. No. 09/619,859. It is especially preferred that two different users not be allowed to select the same fictitious account name so that a fictitious account name also represents a unique identifier. However, the preferred embodiment could also be used in connection with a prepaid account. In such a scenario, the first entity could simply purchase a prepaid card and no real identity would ever be required.

When the first entity establishes an account with the money source, a user key must be selected. The user key can be a Personal Identification Number, or "PIN," similar to that which is currently in widespread use in the United States in connection with automated teller machines. Both the first entity and the money source must have access to the user key, which can be selected by either entity. In order to be able to retrieve this user key, the money source must create a record associated with the first entity that includes the user key and a first entity identifier (whether this be the real name of the first entity or a fictitious account name).

Once the first entity has established an account with the money source and a user key has been selected, the first entity must be supplied with the means to generate a customer one-time unique purchase order number ("Coupon"). As already described, this could be hardware or software, but, in either case, it will include a customer random number generator and a customer permutation variable that is correlated with a customer sequence number.

There is some debate, within the mathematical and cryptographic communities, as to what constitutes a "random number generator." At times, the term is used somewhat loosely, and sometimes it is used to refer to what is also commonly referred to as a "pseudo random number generator. In the context of the present invention, a "random number generator" shall be defined to include a pseudo-random number generator. The details of how a random number generator (or a pseudo-random number generator) works, and how they can be used to generate a series of random (or pseudo-random) numbers, are well known in the art of cryptography and will not be repeated here. (A general description of random number generators and various pseudo-random number generators, and a discussion of common implementation mistakes that are made when using pseudo-random generators, is set forth in ICSA Guide to Cryptography (McGraw-Hill 1999), by Randall K. Nichols, at pages 356, 399-406, and 702, the disclosure of which is specifically incorporated herein by reference.)

A person skilled in the art could choose one of many different "random number generators" known in the art for use in connection with the present invention, and any number of such devices will suffice, although it is probably most desirable, from a security standpoint, to use a cryptographic pseudo-random number generator. In an especially preferred embodiment, the "random number generator" is what has been referred to by H. D. Knoble as a "Portable Quasi-Random Number Generator." More specifically, it is especially preferred that the random number generator be an additive three part prime modulus multiplicative linear congruent random number generator which can be generated by the following algorithm:

$$RN=INT((R-(INT(R)))\times 10)$$

where RN is the random number, INT stands for an Integer function, and R is calculated as follows:

$$R=(SA/K4)+(SB/K8)+(SC/K12), \text{ where}$$

$$SA=K1\times MOD(SA,K2)-K3\times(SA/K2), \text{ but if } SA \text{ is less than zero}, SA=SA+K4,$$

$$SB=K5\times MOD(SB,K6)-K7\times(SB/K6), \text{ but if } SB \text{ is less than zero}, SB=SB+K8,$$

$$SC=K9\times MOD(SC,K10)-K11\times(SC/K10), \text{ but if } SC \text{ is less than zero}, SC=SC+K12,$$

where SA, SB and SC are seed values, all K numbers are constants, and MOD is a Modulo function. The above-identified algorithm uses three additive parts, but an algorithm with additional (or, less preferably, fewer) additive parts could also be used. Additional details concerning Modulo and Integer functions can be obtained from VS FORTRAN Application Programming: Language Reference, Release 2.0, IBM (3rd Ed., September 1982), pages 215 and 216, the disclosure of which is specifically incorporated herein by reference.

The customer random generator is used to generate a sequence of numbers with qualities similar to that of a sequence of truly random numbers. By using a pseudo-random number generator, the sequence will be fixed for a given algorithm, using a given set of constants, starting from a given seed value. A number in such a sequence can be referenced by its position relative to an initial setting, and this shall be referred to as a sequence number. Thus, a string of one hundred numbers generated by a random number generator can be assigned sequence numbers of 1-100, respectively, which means that the fiftieth number in the string would be assigned the sequence number of 50.

Because the money source must also use a random number generator, the customer random number generator and the money random number generator must be synchronized so that they will achieve identical results when the customer sequence number and the money source sequence number are identical. If a money source wants a number of different customers to use the same random number generator but generate different sequences of numbers, such results can be obtained several ways. For example, different customers might have different initial seed values, different customers might have one or more different constants, different customers might have a different permutation variable as an initial setting, or two or more of these options might be employed.

When the first entity wishes to generate a Coupon, the first entity enters the user key into the hardware or software used to generate the Coupon. Once the user key is entered, it is combined with a customer permutation variable that is correlated with a customer sequence number to form a customer permutated user key. The combination can be done by any number of mathematical functions (simple examples of which are addition, subtraction, division and multiplication) or by any suitable algorithm or set of rules. The customer permutation variable and the customer sequence number can be correlated in many different ways, the simplest example of which is that they are identical. Another example of a simple correlation would be to vary the permutation variable according to a preselected algorithm in accordance with the customer sequence number, or through use of the customer sequence number as an input into the algorithm.

The customer permutated user key and the user insertion key are used as input variables in an algorithm to form a Coupon. In an especially preferred embodiment, the customer permutated user key is inserted into a user account number. Simple methods of insertion include addition and substitution, or a combination of the two. After a Coupon is generated, the customer sequence number is changed, and a new entry of the user key will result in generation of a new customer permutated user key and a new Coupon. Because generation of the Coupon can be done by a computer (whether it be a "traditional" computer or some other device that can be a host computer or a client computer, such as a chip located in an electronic card or telephone), for all practical purposes, the Coupon can be generated as soon as the user key is entered into the computer.

Once a Coupon is generated, it can be transferred to a second entity, along with a first identity identifier, to pay for goods or services and, in turn, the Coupon and the first identity identifier can be transferred to the money center.

When a customer's user key is entered into an input device, there is always a possibility of mistake due to human error. Accordingly, it is highly desirable to provide a mechanism to account for such mistakes. However, the mechanism should be controlled to avoid the possibility of an unacceptable compromise to security, as could be the case if unlimited errors in entry of the customer's user key are allowed. The preferred embodiment provides a mechanism to satisfy both desires by the method a Coupon is validated and by allowing the customer random number generator and the money source random number generator to be resynchronized from a first setting to a second setting.

A Coupon is validated when the money source determines that the Coupon is valid for the first entity identifier submitted with the Coupon. In order to determine what Coupons might be valid for the first entity, the money source determines what Coupons the first entity will generate, and the order in which they will be generated. One way that the money source can determine what Coupons will be generated by the first entity is to generate coupons from the same starting input that would be used by the first entity, using the same random number generator. In other words, the money source uses a money source random generator that uses the same algorithm as the customer random generator (including initial seed(s) and constants), using the same user key. Thus, when the money source generates a money source Coupon from a money source sequence number that is identical to a customer sequence number used by a customer to generate a Coupon, the money source Coupon should be identical to, and thus match, the Coupon. This, in turn, validates the Coupon.

Validation of a Coupon is very simple to implement when the customer sequence number and the money source setting are synchronized. The money source Coupon could be generated at the time the Coupon is submitted for validation, or it could already be generated, and stored, in a look-up table. However, there are reasons why such synchronization may not exist. For example, a customer might generate a Coupon but, for whatever reason, not use it. Alternatively, a consumer might make a mistake and not enter the correct user key, and thus generate an invalid Coupon. (Although the latter possibility could be avoided by storing the user key in the hardware/software and confirming that the user key entered is correct, such storage is undesirable since the existence of such a record compromises security).

In order to account for the possibility that the customer sequence number and the money source setting may not be synchronized, validation can be permitted if the Coupon matches any one of a preselected number of money source Coupons generated in series by the money source from an expected starting value of the customer sequence number. (Selection of the preselected number is a matter of design choice that involves a tradeoff between usability and security, and the number might be changed at different times or for different conditions.) Although such series could be generated at the time of submission of a Coupon for validation, it is especially preferred that the series be generated and stored as a sequential set that can be queried upon submission of a Coupon for validation. Using this methodology, once a Coupon is validated, the matching money source Coupon and all earlier created money source Coupons can be deleted from the sequential set. Then, since the sequential set now contains less than the preselected number of Coupons, one or more additional money source Coupons are generated to bring the population of money source Coupons back up to the preselected number (or a newly selected number).

The use of a sequential set of money source Coupons works well as long as Coupons are submitted for verification in correct sequential order. Normally, this should not be a problem. However, there may be instances where this could present a problem, such as use of a Coupon to pay for something ordered by mail. In order to account for such a possibility, the money source can store money source Coupons deleted from the sequential set in a recent history file, and this file can be maintained for a preselected length of time. Using this methodology, if a match with a money source Coupon stored in the sequential set does not validate a Coupon, a match with a money source Coupon stored in the recent history file can still validate it. However, the money source might also want to implement additional security measures when validating a Coupon by comparison with the recent history file. Thus, in the given example of a mail order, the money source might also require that the shipping address match an approved shipping address for the first entity. Alternatively, the money source might also require independent confirmation of the validity of the Coupon by contacting the first entity, e.g. by telephone or e-mail, if the value of the Coupon exceeds a threshold limit.

If a Coupon is not validated, the money source will reject it as invalid. The Coupon might be invalid due to error by the first entity, or due to error somewhere during its path of transmission to the money source, or due to fraudulent activity. Accordingly, it is highly desirable not to place a hold on activity by a customer whose first entity identifier has been used with an invalid Coupon until such activity exceeds a threshold level. Once this threshold level has been exceeded because a preselected number of invalid Coupons are not verified for the first entity, an invalid user account number condition can be triggered to prevent any further processing of Coupons submitted with the first entity identifier until the invalid user account number condition is removed.

If a first entity has submitted too many invalid Coupons, or has just gotten too far out of synchronization from the money source (e.g., a child playing with an electronic card), it may be desirable to resynchronize the customer random number generator with the bank random number generator. One easy way to do this is as follows. The first entity could contact the money source, enter the first entity's user key, and provide the money source with the resultant Coupon. The money source could then use this Coupon to determine what customer sequence number was used to generate the Coupon, and reset its records accordingly, as is illustrated in the following example:

Assume that the sequential set maintained by the money source contains 10 money source Coupons, that the first entity has previously successfully submitted Coupons for transactions 1-5, and that the first entity's customer sequence number is now 25. When the first entity contacts the money source, the Coupon that it will generate will be the 25th Coupon in a string, but the sequential set maintained by the money source will only contain the 6th through 15th Coupons. Therefore, the money source will not generate a match until its 25th money source Coupon is generated, at which point the customer random number generator and the money source random number generator will be resynchronized. Next, the money source will generate money source Coupons 26 through 35 and place them in its sequential set of money source Coupons for the first entity, and an invalid user account number condition, if set, can be removed.

Another way that the customer random number generator and the money source random number generator can be resynchronized is for the money source to provide the first entity with a new seed value to be input into the random number generator, but this would require some mechanism to allow such input. In the case of an electronic card, telephone or other hardware device, a special function key, followed by the input, might perform this.

Although the foregoing discussion of the preferred embodiment has focused on use of a single Coupon, additional security could be obtained by requiring use of two or more Coupons for a given transaction, especially if it exceeds a preselected threshold value or if a requirement for additional security is triggered. If two Coupons are required to process a given transaction, it is far less likely that a random guess or person without access to the valid user key and requisite algorithm could generate a correct sequence of Coupons. This fact can also be used to prove fraudulent or unauthorized use, or to check for such use. For example, suppose a first entity submits a Coupon for validation in connection with a certain transaction, and its validity is called into question. The first entity could be prompted to provide one or more additional valid Coupons, and if this could not be done, it would be a good indication of potential fraud.

In certain types of transactions, such as transactions over the Internet, there is some possibility that a first entity identifier could be intercepted and somebody might make fraudulent attempts to guess a valid Coupon for an intercepted first entity identifier without actual possession of authorized hardware or software that might be used to generate a valid Coupon. Once again, by requiring use of two or more valid Coupons, the potential for fraud could be reduced. Alternatively, the first entity could be asked to generate a Coupon using an incorrect user key. In this scenario, if the first entity does not actually have possession of the hardware or software to generate a Coupon, it would not be possible for the first entity to generate the Coupon that could be generated by the money source through use of the incorrect user key, the money source permutation variable and the money source sequence number.

Fraudulent activity might also be detected by the nature of invalid Coupons submitted for verification. When the money source receives a Coupon for verification, it is possible to work backwards from the Coupon to determine what user key and permutation variable were used to generate the Coupon for a given sequence number. Based upon what user keys were used in generating invalid Coupons, it might be possible to spot potential fraudulent activity. It is also possible to detect or deter fraudulent activity, and increase security, if the user key is periodically changed. This can be done when the first entity and the money source validly agree to change the user key, and the money source's records are changed accordingly (including the money source Coupons contained within the sequential set).

Although the foregoing detailed description is illustrative of preferred embodiments of the present invention, it is to be understood that additional embodiments thereof will be obvious to those skilled in the art. For example, the same inventive concepts disclosed herein could be used in a system in which a customer has two or more account numbers and/or identities, with the same or different user keys. In the case of an electronic card or telephone, this would allow the customer to select which account should be used (for example, to choose a business credit card for use with a business expense, a personal credit card for use with a personal expense, or a bank card at a local store for groceries and cash back). Alternatively, a customer might be permitted to use multiple user keys for the same account number and the same identity. This could allow some of the same functionality, or it could be used to classify the type or nature of the expense or transaction. Further modifications are also possible in alternative embodiments without departing from the inventive concept.

Accordingly, this disclosure includes the following methods.

Method 1. A method for providing multiple secure transactions between a first entity and at least one additional entity, comprising the steps of:

(1) generating a customer one-time unique purchase order number ("Coupon") for the first entity by the following steps:

(a) combining a user key with a customer permutation variable that is correlated with a customer sequence number to form a customer permutated user key;

(b) using a customer random number generator to generate a customer user insertion key that is correlated with the customer sequence number; and (c) generating a Coupon from a user account number by inserting the permutated user key into the user account number in accordance with an algorithm that uses the customer user insertion key;

(2) transferring the Coupon and a first entity identifier to a second entity;

(3) transferring the Coupon and the first entity identifier from the second entity to a money source repository;

(4) creating a sequential set of the money source repository having a preselected number of money source Coupons for the first entity by the following steps:

(a) combining the user key with a money source permutation variable that is correlated with a money source sequence number to form a money source permutated user key;

(b) using a money source random number generator to generate a money source user insertion key that is correlated with the money source sequence number;

(c) generating a money source Coupon from the user account number by inserting the money source permutated user key into the user account number in accordance with the algorithm that uses the money source user insertion key, wherein the money source Coupon is correlated with the money source sequence number and stored in the sequential set, said money source Coupon being identical to the Coupon when the customer permutation variable and the money source permutation variable are identical;

(d) changing the money source sequence number; and (e) repeating steps (a) through (d) as needed so that the sequential set has the preselected number of money source Coupons;

(5) verifying that the Coupon is valid for the first entity by confirming that it is identical to a matching money source Coupon contained within the sequential set;

(6) deleting the matching money source Coupon and all earlier created money source Coupons from the sequential set;

(7) changing the customer sequence number; and (8) repeating steps (2) through (7).

Method 2. A method as recited in method 1, wherein the second entity is comprised of a plurality of different entities.

Method 3. A method as recited in method 1, wherein the customer random number generator and the money source random number generator are resynchronized from a first setting to a second setting.

Method 4. A method as recited in method 1, wherein the customer sequence number is changed every time a Coupon is generated.

Method 5. A method as recited in method 1, wherein the user key is entered into an input device whose output is used to generate the Coupon.

Method 6. A method as recited in method 5, wherein the customer sequence number is changed every time the user key is entered into the input device.

Method 7. A method as recited in method 1, comprising the following additional steps:

setting an invalid user account number condition if a preselected number of Coupons are not verified for the first entity; and terminating step (5) when the invalid user account number condition is set.

The disclosure of U.S. Ser. No. 10/968,401 provides an unprecedented opportunity to customize use and processing of payment card transactions through use of one or more customization variables.

In the context of this description, a one-time payment card number refers to a payment card number of either a credit or a debit card, generated in accordance with the present invention, that is useful in financial transactions in the same fashion as a traditional payment card number.

Like a traditional payment card number, a one-time payment card number should be capable of being read by a standard magnetic stripe reader when it is part of a physical card used in traditional face-to-face transactions in which a user presents the physical card to a merchant for payment. However, like traditional payment card numbers, a one-time payment card number should also be capable of being used in a Mail Order Telephone Order ("MOTO") credit card transaction between the user and a merchant. Thus, like a traditional payment card number, the one-time payment card number should fit within, and work with, present platforms and protocols for financial transactions involving payment cards, such as traditional credit cards. This versatility allows the one-time payment card number to be used with electronic cards, software programs used in network applications, or telephones (especially telephones used in what is now being referred to as m-commerce, or mobile commerce).

A traditional payment card number can be characterized as having three parts. First, there is a set of fixed variables. This contains numerals that represent certain specified data fields, such as a bank identifier and a month and year expiration date for a given payment card. (The "bank" may be any "money source" as that term has been defined in U.S. Pat. No. 5,937,394.) Second, there is a set of variable variables. This contains numerals that will vary for different payment cards issued by the same money source. In other words, this is the portion of the card number that will be specific to an individual entity or account for a given issuing money source. Third, there is a check sum digit. The value of the check sum digit is dictated by the other numerals in the card number.

In the context of the present invention, a user one-time payment card number is akin to a traditional payment card number, with certain exceptions. In a traditional payment card number, there might be a set of six fixed variables, followed by a set of nine variable variables, followed by a check sum digit and another set of four fixed variables representing the month and year. When a user uses this traditional payment card number to complete a given financial transaction, the transaction is always completed by using the same twenty digits for the payment card number. By contrast, if the user uses a one-time payment card number to complete any such given financial transaction, the transaction will not be completed by always using the same twenty digits for the payment card number. Instead, the twenty digits of the one-time payment card number will vary, and the degree to which they vary may depend upon user selection of a customization parameter. In addition, because the one-time payment card number varies with successive usage, the check sum digit will not necessarily be the same with successive usage, although it may be. Thus, the check sum digit must be recalculated for each new one-time payment card number, and this is why it shall be referred to as a "check sum variable" in the context of a one-time payment card number according to the present invention.

Another difference between a traditional payment card number and a one-time payment card number is the way that a given transaction using either number is validated by a verification agency, which may be a money source or an entity who processes payment card transactions. When a transaction involving a one-time payment card number is processed, the verification agency must verify that the one-time payment card number is valid for the user identifier for the particular given transaction, as opposed to any given transaction involving the user identifier. (The verification process must take into account how selection of the customization parameter may affect what the verification agency will receive for verification. Additional details regarding procedures that can be used to verify a one-time card number that can be customized are set forth in U.S. Pat. No. 6,609,654.) This difference is a reason why use of the one-time payment card number provides greater security and anonymity than can be obtained through use of a traditional payment card.

A card number generator generates a one-time payment card number. As already described, this could be hardware or software, but, in either case, it will preferably include a customer random number generator and a customer sequence number. It is especially preferred that the card number generator be part of an electronic card, and that the electronic card be of the type described in U.S. application Ser. No. 09/571,707 filed May 15, 2000 for Anonymous Electronic Card for Generating Personal Coupons Useful in Commercial and Security Transactions, or in U.S. application Ser. No. 09/667,835.

Several different methods can be used to generate a one-time payment card. No matter what method is used to generate a one-time payment card number, two successive one-time payment card numbers should be different. This can be accomplished by using a sequence number that is changed after each one-time payment card number is generated. (The present invention does not require that all theoretical possibilities will result in different one-time payment card numbers. Instead, it is preferred that there be a low probability of occurrence of identical one-time payment card numbers attributable to convergence of two different inputs leading to the same result due to operations performed on the inputs by the algorithm.)

The preferred embodiments allow a user to customize use of an electronic card having a card number that varies with each use by selecting at least one customization parameter to customize a given use of the electronic card. There are three general customization parameters that can be used to customize a given use.

First, the user can customize generation of the one-time card number. This can be done many different ways. An example of one way in which it can be done is to customize selection of a selected user key that is used to generate the one-time card number as is explained in U.S. Pat. No. 6,609,654. Another way in which it can be done is to include a customization variable in the one-time card number, or as an input into the algorithm used to generate the one-time card number.

Second, the user can customize the user identifier that is used to validate the one-time card number. This can be done many different ways. One way is to choose one of two or more preselected identifiers as a selected user identifier. Another way is to modify the user identifier. Still another way is to add a customization variable, such as a numeric character, to the user identifier at a preselected location.

Third, the user can include a customization variable with information transmitted to a verification agency for validation of the given use. Unlike the first two customization parameters, this parameter relies upon use of an additional field of data collected as part of the validation process for a given transaction, and this may require a change in established validation protocols. It is especially preferred that any such change be technically feasible within the confines of hardware that is being used to process traditional payment card transactions. In the context of an electronic card with a magnetic stripe, this means that it is preferred that the additional customization variable be stored in the magnetic stripe, and it is especially preferred that it be stored in the second track of the magnetic stripe. Additional details regarding inclusion of a customization variable in a magnetic stripe are set forth in U.S. Ser. No. 09/667,089.

Once it is recognized that using one or more of the foregoing customization parameters will customize a given transaction involving use of a one-time payment card number, and that such customization will seamlessly allow a user to transmit additional information to the money source processing such transaction, without loss of desired security or anonymity, the options for using such customization are virtually limitless.

After a one-time payment card number is validated for a given transaction, the money source can determine what customization parameter(s) was selected by the user for the given transaction, which allows the money source to determine what handling option should be used for the transaction involving the one-time payment card number. (It also allows the money source to determine what sequence number is associated with the one-time payment card number, so that its records can be synchronized as part of the validation process.)

One use of multiple handling options is to allow the money source to access multiple accounts. For example, a user might use one account as a credit card, and another account as a debit or checking card. By choosing which account should be used for a given transaction, the user could determine, at the point of use, whether to charge the transaction, or have it deducted from an existing account balance. The same idea could be used for multiple credit cards, whether they are from the same issuer or different issuers, or even different cards, such as Visa®, MasterCard®, Diner's Card®, Discover® or American Express®. In addition, the user might elect to have separate billing statements for separate accounts, or have all billing consolidated in a single statement.

Another use of multiple handling options is to allow identification of the person completing a transaction, or to allow multiple persons access to a single account, or place different restrictions on multiple persons on a single account. For example, a single account might be opened with an issuing bank, but an entire family might be authorized to use the account. Thus, a father and a mother might have their own customization parameter, a teenage child might have another customization parameter and a lower authorized spending limit, and a preteen child might have a fourth customization parameter, but only be authorized to engage in a certain limited number of transactions per time period with a maximum spending limit for each transaction. All the members of this family could use the same card number generator embedded within a PDA or mobile phone, or on a computer or in an electronic card. At the end of a specified billing cycle, all transactions completed by any member of this family could be consolidated in a single bill, and that bill could indicate who spent what when during the billing cycle, and what it was spent on.

Still another use of multiple handling options is to allow a user to classify the nature of a particular transaction at the time it is completed. For example, suppose an individual uses a single credit card for personal expenditures and business expenditures. By assigning one customization parameter to personal transactions, and a second customization parameter to business transactions, the user can simplify accounting for such transactions without the necessity of having and carrying two separate cards. If desired, the user could even receive two separate statements for such expenditures so that the personal expenditures would not be discernable from the documentation associated with the business expenditures. Individual transactions could also be classified according to a preselected set of criteria, and such criteria could be used in various financial programs. For example, a user might include a code classification system used in a money management system to create various reports that itemize categories of spending or assist in budgeting of finances.

Yet another use of multiple handling options is to allow a user to preselect how a particular transaction is treated in a subsequent bill. For example, an individual user might not want a billing statement to include information about the identity of second entities who provide certain goods or services, or when transactions with such entities take place, but still want to have the billing statement include such information for other transactions. By selecting two different customization parameters with these two different handling options, the user has the option of controlling what information it receives in billing statements about individual transactions.

Multiple handling options can also be used to guard privacy, or for commercial purposes that do not presently exist. For example, the user and the money source might enter into an agreement about how, and under what circumstances, the money source can distribute information about transactions of the user, depending upon which customization parameter is used in a given transaction. The agreement might provide different levels of confidentiality, and set up different levels or types of compensation tied to transactions falling within the different levels for a given time period.

One level of confidentiality might restrict distribution of any information concerning a transaction by the money source to any third party. For example, a user might want strict confidentiality of any transaction involving medical services, and would not want the money source to divulge that information to any party unless legally required to do so. Or, maybe the user does not want any third party to learn of any transaction that exceeds a certain dollar amount, for fear of a potential deluge of unsolicited advertising. A user might pay a monthly fee for use of this option, a transaction based fee, or no fee at all.

A second level of confidentiality might permit distribution of any information concerning a transaction by the money source to any third party. Such information is potentially valuable for purposes of advertising, and creating profiles for targeted marketing, and the money source might even pay the user for the right to sell such information.

Other levels of confidentiality might fall between those already noted. For example, a third level might permit distribution of certain information concerning a transaction (such as the payee, the amount of purchase, the date of purchase, and a profile of the user), but restrict distribution of other information concerning a transaction (such as the identity of the user). Another level of confidentiality might restrict distribution of information concerning a transaction to any third party, but allow the money source to use such information for its own marketing efforts directed to the user.

The teachings of U.S. Ser. No. 09/960,714, which has issued as U.S. Pat. No. 6,805,288, will now be discussed. This disclosure seeks to provide new methods for generating and processing Secure Card Numbers (SCN) that can be used in all types of transactions in which a conventional credit card account number is accepted. In addition, this disclosure conforms to the existing standards for PIN encryption as promulgated by the American Bankers Association (ABA), the American National Standards Institute (ANSI), the International Standards Organization (ISO), and the Federal Information Processing Standards (FIPS) Publications of the National Institute of Standards and Technology (NIST). Because the methodology is well suited for use in hardware and software applications, it has widespread applicability to many different types of transactions.

The present disclosure is related to the concept of customer one-time unique purchase order numbers ("Coupons") as described in U.S. Ser. No. 09/640,044. An algorithm is executed that uses a user account number, a customer sequence number, a customer permutated user key, and a Transaction Information Block (TIB) as input variables to form an SCN that is correlated with a sequence number. Combining a user key with a user account number, a user insertion key correlated with the customer sequence number, and then encrypting the result using the Triple Data Encryption Standards (TDES), forms the customer permutated user key. A random number generator generates the user insertion key that is correlated with the sequence number. The TIB may provide several pieces of information, including the conditions under which the SCN will be valid (i.e., the SCN type), additional account identification information, and the status of the device used for SCN generation. The sequence number can be changed after each SCN is generated and a new SCN can then be generated using a new user insertion variable correlated to the changed sequence number.

After an SCN is generated, it is transferred with a first entity identifier to a second entity (which can actually be several entities), which then transfers the information to a money source. An individual SCN is verified as being valid by the money source by duplicating the generation of the customer permutated user key for the specified first entity and the specified sequence number, and then comparing it to the customer permutated user key which is embedded in the provided SCN. Additionally, the money source verifies that the specified SCN type is valid given the specific conditions of the transaction. Once verified as valid, each SCN passes through a life cycle in accordance with conventional credit card processing practices and with its SCN type, in which it may be used for various types of transactions before being retired. If a preselected number of SCNs are received by the money source and determined to be invalid (either consecutively or within a predetermined timeframe), then an invalid user account number condition is set to prevent further attempts to verify SCNs for that first entity.

A user key can be entered into an input device which validates the user key by comparing it to a stored user key. If the entered user key is valid, the user can generate an SCN. The sequence number changes each time a user key is entered into the input device.

A preferred embodiment of this disclosure is adapted for use in credit card transactions, and as such can be used in connection with a wide variety of instruments that can be used in connection with such financial transactions: electronic cards, software programs used in network applications, telephones (especially telephones used in what is now being referred to as m-commerce, or mobile commerce), or even physical imprint transactions. Moreover, it can be used whether such transactions are conducted in person, face-to-face, or whether such transactions are conducted by an indirect medium, such as a mail order transaction, a transaction conducted over a computer network (for example, the Internet), or a telephone transaction.

As is the case in most financial transactions, three parties are typically involved in completed credit card transactions according to the present invention. A party presents a credit card account number with the intent to initiate a monetary payment (or credit/return). In the context of the following description, this is the first entity or customer. Another party receives the credit card account number with the intent to receive a monetary payment (or credit/return), and this party can be a single party or two or more parties. In the context of the following description, the party or parties that are receiving the credit card account number are referred to as the second entity or merchant. Finally, there is at least one party, and usually multiple parties, that serve as intermediaries to the monetary payment (or credit/return). The second entity provides the credit card account number to this party over several transactions to effect the monetary payment (or credit/return): authorization, incremental authorization, authorization reversal, settlement, and credit/return. The intermediary group of one or more parties will be referred to in the context of the following description as a money source. Thus, the money source may be one or more banks, a credit card company or any other institution involved with issuance of credit cards or bank debit cards, such as a credit union or other institution, or a money source as described in U.S. Pat. No. 5,913,203.

In connection with this embodiment, it is not necessary that the first entity use a real identity, although such an option is also acceptable. Instead, a pseudonym, such as a screen name or an alias, could be used to protect the first entity's privacy and provide additional security.

Although the first entity need not use a real identity, the first entity must establish an account with a money source. When the account is established, the first entity and the money source must agree upon a payment mechanism or protocol. In the case of a credit card or a bank card, this could be done in the same fashion as exists today, and the first entity could select a fictitious account name as is explained in greater detail in co-pending U.S. patent application Ser. No. 09/619,859. It is especially preferred that two different users not be allowed to select the same fictitious account name so that a fictitious account name also represents a unique identifier. However, the preferred embodiment could also be used in connection with a prepaid account. In such a scenario, the first entity could simply purchase a prepaid card and no real identity would ever be required.

When the first entity establishes an account with the money source, a user key must be selected. The user key can be a PIN, similar to that which is currently in widespread use in the United States in connection with automated teller machines. Both the first entity and the money source must have access to the user key, which can be selected by either entity. In order to be able to retrieve this user key, the money source must create a record associated with the first entity that includes the user key and a first entity identifier (whether this be the real name of the first entity or a fictitious account name).

Once the first entity has established an account with the money source and a user key has been selected, the first entity must be supplied with the means to generate a customer SCN. As already described, this could be hardware or software, but in either case it will include a user account number, a customer random number generator that will be used to generate user insertion keys that are correlated with a customer sequence number, and TDES encryption keys.

The TDES encryption standard is the accepted standard for protecting a PIN during data transmission of financial transactions, as described by ISO 9564-1-1991 (Banking—Personal Identification Number Management and Security—PIN Protection Principles and Techniques, Section 6.2), ISO 9564-2-1991 (Banking—Personal Identification Number Management and Security—Approved Algorithms for PIN Encipherment), ANSI X9.52-1998 (Triple Data Encryption Algorithm—Modes of Operation), and FIPS PUB 46-3 (Data Encryption Standard (DES), dated 1999), the disclosures of which are specifically incorporated herein by reference.

In order to effectively use TDES for PIN encryption, the PIN must be combined with a new set of randomly generated data for each transaction. Otherwise, the encrypted PIN would always be the same value. A customer random number generator, such as the one that is described in U.S. patent application Ser. No. 09/640,044, filed Aug. 15, 2000 and which is generally known as a Linear Congruential Generator (LCG), is used for this purpose. This random number generator is algorithmic (i.e., pseudo-random)—when starting with the same set of seeds, it always produces the same sequence of numbers. It can therefore be reproduced by the money source in order to validate a given SCN. Furthermore, since this pseudo random number generator generates its values in a reproducible sequence, each of the values in the sequence can be identified by a Counter value that indicates that numbers location in the sequence. The set of random numbers generated and combined with the PIN are collectively referred to as the Sequence Insertion Number (SIN).

In the real world of credit card transactions, it is not possible to assume that transactions conducted by the first entity in a given order will always be received by the money source in that same order. Therefore, the money source method of SCN validation must be based on an embedded sequence value. The Counter value is used for this purpose in the preferred embodiment.

In general, this method can be used to generate SCNs of many different lengths. In the conventional credit card processing infrastructure, a credit card number is typically 16 digits in length. Such a number comprises three sub-numbers: a 6 digit Bank Identification Number (BIN), a 9-digit account number, and a 1-digit checksum number. For the purpose of being compatible with the existing credit card processing infrastructure, the SCN could be 9 digits in length, and could take the place of the account number in the conventional 16-digit credit card number.

In a preferred embodiment, the 9-digit SCN itself comprises three sub-numbers: a 1 digit TIB, a 4 digit Counter Block (which identifies the random number being used for encryption), and a 4 digit encrypted PIN Block.

The 1 digit TIB may take on up to 10 different values, each of which may indicate multiple pieces of information. The TIB can be used to determine which of a plurality of account numbers associated with the first entity should be used for the first transaction. The account numbers can represent, for example, different credit card accounts or different payment or credit cards. A first account number might be associated with the TIB value of 0, a second account number might be associated with the values of 1 and 2, a third account number might be associated with values of 3 and 4, and so forth, wherein any odd value may be restricted to a one transaction limitation while any even value may be used to invoke permission for multiple transactions at a single merchant. In the preferred embodiment, a TIB value of 0 indicates that the SCN may only be used for one transaction; any attempts to use it for subsequent transactions will result in a transaction denial from the money source. A value of 1 indicates the same transaction restrictions as 0, but also indicates that the device generating the SCN has a low battery power condition. A low battery power condition can be detected by a diagnostic program or it can be extrapolated from an empirical record (or counter) of the number of transactions presented for authorization. The transaction counter used to extrapolate a low batter power condition can be collected from the firmware used to generate SCNs or from software behind the money source firewall. A value of 2 indicates that the SCN may be used for multiple transactions, but only at a single merchant; any attempts to use it for subsequent transactions at a different merchant will result in a transaction denial from the money source. A value of 3 indicates the same transaction restrictions as 1, but also indicates that the device generating the SCN has a low battery power condition. Furthermore, a set of TIB values (4, 5, 6, 7) might represent the same restriction and status information as (0, 1, 2, 3), respectively, but further indicate that the transaction is associated with a different subentity (e.g., the first entity identifier identifies a married couple, and the TIB identifies each individual spouse.) Other values might also be used to enforce additional transaction restrictions in ways readily apparent to those skilled in the art.

The TIB can also be used by the money source to uniquely identify a physical device (such as an electronic card) used to generate the SCN. This aspect of the TIB is especially useful when the money source issues more than one card to a first entity. Multiple cards might be issued to the same person (i.e., the first entity) for different uses, or multiple cards might be issued to the same person for use by different individuals (such as family members). In such instances, the TIB can identify which physical card, issued to the first entity, is used for a given transaction. When the TIB is used in this way, the TIB can be used as a customization variable to recognize multiple cards otherwise issued to a single first entity (which might also be a legal entity, such as a corporation).

The 4-digit Counter Block is unencrypted information provided so that the money source may decrypt and validate the SCN. It may be simply the actual Counter value (incremented after each use), but in the preferred embodiment, it is created by adding the Counter value to a starting value known to both the first entity and to the money source.

The 4-digit PIN Block is the encrypted information that is used to validate the fact that the SCN originated from the first entity. The PIN Block is formed using the PIN, the SIN, and a starting value known to both the first entity and to the money source. It is encrypted using TDES, which requires use of three 64-bit keys known to both the first entity and to the money source. In order to encrypt such a small number (16 bits) with such a high level of encryption (158 bits), the PIN must first be expanded to a 64 bit number, then encrypted, and finally reduced back to a 16 bit number—and in such a way that it is guaranteed to be different for each transaction.

The SIN is the product of an LCG random number generator that is initialized with three 2-byte integer seeds—the result of operating the LCG on these seeds is a 2-byte random value. The 8-byte SIN consists of the three seeds plus the random value. As a by-product of its operation, the LCG also produces three new seeds, which will be used for the next iteration of the LCG algorithm. The SIN may therefore be associated with a Counter value that indicates a unique location in the sequence of seeds and value generated by the LCG. This SIN is used as the random basis for each successively TDES-encrypted PIN Block, and guarantees a properly encrypted PIN Block for each transaction. To allow proper validation of the SCN, the Counter value stored in the Counter block is the one associated with the SIN used as the random basis for the PIN Block.

The creation of the PIN Block starts by dividing the 8-byte SIN into four 2-byte integers. The PIN and a predefined constant value are both added to each individual 2-byte integer. The results are then concatenated back again to form an 8-byte input block to the TDES algorithm, which encrypts them into an 8-byte output block. The output block is then divided back into four 2-byte integers (x1, x2, x3, x4). These four values are then used in the following formula to produce the 4-digit PIN Block value P:

Formula 1: PRNG Value Calculation

In this formula, the four values (A,B,C,D) are each odd integers. The "mod" calculation is a standard modulo arithmetic operation, and works as follows: if the resulting number is greater than 10,000 (or 20,000 or 30,000, etc.), then the value of 10,000 (or 20,000 or 30,000, etc.) is subtracted from it, leaving a positive four digit value.

Once created, the SCN is transmitted along with the first entity identifier from the first entity to the second entity and, subsequently, to the money source. In one embodiment, the SCN is used in an account number that replaces the conventional credit card number, and the first entity identifier is a static 9 digit number pre-assigned to the first entity that is transferred to the money source in a non-account data field. In the case of an electronic swipe credit card transaction, the first entity identifier is dynamically encoded onto Track 1 and/or Track 2 of the magnetic stripe in the area known as the Discretionary Data Field, which comprises up to 13 digits of information. In the case of a transaction where the first entity is not present, such as a mail order, telephone order, or Internet order, the first entity identifier is transmitted as part of the Billing Address field in one of many possible forms. For example, it may be entered as "P.O. Box <first-entity-identifier>".

In an especially preferred embodiment, the SCN is not used in an account number to replace the conventional credit card number, but is instead used in conjunction with it—the conventional credit card number itself functions as the first entity identifier, and the SCN is used as a dynamic digital signature to positively identify the first entity and is transferred to the money source in a non-account field of data. In this case, the SCN is transmitted either in the Discretionary Data Field of Track 1 and/or Track 2 or via the Billing Address in a card-not-present transaction.

The Money Source validates the SCN by using the first entity identifier to lookup the information necessary to reproduce the PIN Block encryption for the first entity: the TDES keys, the LCG Seeds, and the PIN. The Money source determines the Counter value by examining the Counter Block, reproduces the calculation of the PIN Block, and then compares the results to the received PIN Block to perform the actual validation.

The Money Source also validates the usage of the SCN based on the embedded TIB. It therefore enforces the various policies based on the first entity's previous transaction history: single-use, multiple-use for single merchant, card-present only.

In the embodiment when the SCN is used in an account number in place of the conventional credit card number, it passes through the standard credit card transaction life-cycle: initial authorization, potential incremental authorization, potential authorization reversal, settlement, and potential credit/return. However, in an especially preferred embodiment, the SCN is only used for initial authorization—beyond that, the Money Source performs its standard transaction processing.

The Money Source may detect fraudulent transaction attempts in various ways. In both the embodiment where the SCN replaces the conventional credit card number, the Money Source may check for re-use of single-use SCNs, use of SCNs without first entity identifiers when the card is not present, re-use of multiple-use/single-merchant SCNs at a different merchant, or SCNs with invalid PIN Blocks. Each of these cases represents a different type of fraud. The Money Source may take various actions in response to each of these types of attacks, such as disabling the account after an excessive number of fraudulent transaction attempts, or returning the code indicating that the merchant should retain the credit card being used for the transaction.

In the preferred embodiment, the Money Source detects fraudulent authorization attempts such as re-use of single-use SCNs, re-use of multiple-use/single-merchant SCNs at a different merchant, SCNs with invalid PIN Blocks, or use of the conventional credit card number on an SCN-enabled account without inclusion of an SCN when the card is not-present. This last case covers simple Internet fraud attempts, but allows, for example, a manual-entry transaction at a POS machine or an imprint transaction. After detecting fraud attempts, the Money Source may take the same types of actions as described above.

It should be noted that the preferred embodiment allows the SCN, when paired with a conventional credit card number, to be validated by back-end software that is integrated with the issuing money source's authorization and settlement processing. An issuing money source can identify an SCN-enabled credit card account in an issuer-determined fashion (e.g., a unique Bank Identification Number). It then forwards select transaction information to the SCN-enabling software, which is installed behind the issuing money source's firewall, which validates the SCN. This means that software generating the SCN can be allowed operate in isolation—it does not have to be in communication with the back-end software—and thus it can be embedded in a credit card or other standalone device.

The inventions described above can be implemented by a money source for use with an electronic card. It is preferable that every user account utilizes the same Pseudo Random Number Generator (PRNG), such as the PRNG described in P. L'Ecuyer, "Efficient and Portable Combined Random Number Generators", Communications of the ACM, 31 (6): 742-749, 774, 1988, the disclosure of which is specifically incorporated herein by reference. However, each cardholder account has a different initial seed, and thus uses a different part of the PRNG sequence. Since the PRNG has an overall period of $10^{12}$, there is ample room for each account to have its own non-repeating subsequence of 10,000 values.

The PRNG is divided into two parts: seed generation (Formula 2) and value calculation (Formula 3). In these formulas (expressed using C code fragments), the set ($S_{x}^{0}$, $S_{x}^{1}$, $S_{x}^{2}$) is a triplet of five-digit values in the range ([1,32362], [1, 31726], [1,31656])), and represents the seed in the $x^{th}$ location in the sequence. Z is interim storage for the pseudo random number, and PRNG[x] indicates the pseudo random number in the $x^{th}$ location in the sequence. Note that for the practical usage of this algorithm, "x" corresponds to the current Counter value. For each transaction, Formula 2 generates the seed (based on the previous seed) and Formula 3 generates the PRNG value.
Formula 2: PRNG Seed Generation
Formula 3: PRNG Value Calculation In all cases, the initial PRNG seed (which generates value 0 in the PRNG sequence) is pre-assigned to the card. Additionally, the most recently used seed is stored in Random Access Memory (RAM). Thus, when an SCN must be generated, the card runs through both Formulas 2 and 3 exactly once, and then updates the seed storage in RAM. The Counter value is also stored in RAM, and is initialized to the value of 1 at the time the card is manufactured. Multiple values of the Counter are stored to detect accidental corruption. Each time an SCN is generated, the current value of the Counter is used. The Counter is then incremented by 1, and stored again for the next use.

Since the SCN is calculated in an algorithmic fashion, it is possible to pre-calculate the values for a given first entity, and store them on an electronic card. This embodiment is most useful where it is more advantageous to store a large amount of data on the electronic card than it is to perform the algorithms discussed above.

Use of the SCN technology described herein is secure when it requires the cardholder to enter a PIN in order to generate a unique SCN that is valid for only one transaction, and for only the specified cardholder. At no time during the transaction is the PIN at risk. By utilizing both encryption and random number generation technologies described herein, it is possible to achieve at least a 99.9% level of protection against fraud.

Thus, this disclosure teaches a method for providing one or more secure transactions between a first entity and at least one additional entity, comprising the steps of: (1) using an electronic card to generate a Secure Card Number ("SON") for the first entity, wherein the SCN is comprised of: (a) a Transaction Information Block ("TIB"); (b) a Counter Block; and (c) an encrypted Personal Identification Number ("PIN") Block; (2) transferring the SCN and a first entity identifier to a second entity in a first transaction; (3) transferring the SCN and the first entity identifier from the second entity to a money source; and (4) verifying that the first transaction is valid with the money source by use of the first entity identifier and the SCN; wherein the TIB can be used for invoking one or more restrictions on use of the SCN; and wherein the TIB is used by the money source to determine whether the device which generated the SCN has changed status condition. The changed status condition can be a low battery condition detected by a diagnostic program or by using an empirical record of the number of transactions presented for authorization and determination of the low battery condition can be made by the electronic card which also keeps the empirical record. Alternatively, determination of the low battery condition is made by the money source which the empirical record. The changed status condition can also be an invalid user input status.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. An electronic card, comprising:
   a power source contained within the card;
   a user selection mechanism operable to allow a user to select a customization variable for a single transaction of the card;
   a processor for generating a transaction specific data packet that includes an account number and a customized number; and
   an electronic communication device operable to cause the data packet to be read by a read head of a magnetic strip reader;
   wherein the electronic communication device is operable to dynamically convey the transaction specific data packet to a read head of a magnetic card reader so that the transaction specific data packet is read by the read head;
   wherein the transaction specific data packet is dynamically generated for use by the card for the single transaction of the card and the customized number is determined based upon the customization variable selected by the user selection mechanism; and
   wherein the account number is a fixed number that can be used by the electronic card for a plurality of consecutive transactions of the card without changing and the customization variable may or may not change for any given transaction of said plurality of consecutive transactions depending upon a user selection for said any given transaction.

2. The electronic card of claim 1 wherein the transaction specific data packet includes a piece of data that is generated by a cryptographic algorithm in response to an input from the user selection mechanism.

3. The electronic card of claim 1 wherein the card number and a cryptographic key are stored in the card and accessible by the processor.

4. The electronic card of claim 1 further comprising:
an algorithm accessible by the processor for checking a battery life parameter and generating a warning signal when a low battery condition is detected; and
electronics for generating a low battery indicator that is included in the transaction specific data packet;
wherein the card periodically uses the algorithm to check the battery life parameter and the card includes the low battery indicator in the data packet once the low battery condition is detected.

5. The electronic card of claim 1 wherein the user selection mechanism is a plurality of buttons that allow the user to select between a plurality of transaction card functions.

6. The electronic card of claim 5 further comprising a visual display for indicating a selection of a particular transaction card function.

7. The electronic card of claim 5 wherein the plurality of buttons is located on a front side of the card.

8. The electronic card of claim 7 further comprising a magnetic stripe located on a back side of the card.

9. The electronic card of claim 1 further comprising a display for displaying at least a portion of the transaction specific data packet to the user.

10. The electronic card of claim 1 further comprising a display for visually displaying the card number.

11. The electronic card of claim 10 wherein the card number is visually displayed in the display in response to an input from the user selection mechanism.

12. The electronic card of claim 1 wherein the processor is affixed to a flexible printed circuit board.

13. The electronic card of claim 1 wherein the electronic communication device is comprised of an electronic encoder.

14. The electronic card of claim 1 wherein the card does not contain a magnetic stripe.

15. The electronic card of claim 1 wherein the user selection mechanism is operable to allow the user to specify whether the single transaction of the card is for business or non-business use.

16. The electronic card of claim 1 wherein the user selection mechanism is operable to allow the user to select one of at least two different handling options by which the user is billed for the single transaction of the card.

17. The electronic card of claim 1 further comprising a diagnostic function accessible by the processor which generates information that is stored the transaction specific data packet.

18. The electronic card of claim 17 wherein the diagnostic function measures at least one parameter and generates a warning signal that is stored in the transaction specific data packet when a preselected threshold is exceeded.

19. The electronic card of claim 1 wherein the transaction specific data packet includes a block of data formed by using a Triple Data Encryption Standard algorithm to encrypt a personal identification number.

20. The electronic card of claim 1 wherein the electronic card is contained within a telephone.

* * * * *